United States Patent
Zaitsev et al.

(10) Patent No.: US 9,886,058 B2
(45) Date of Patent: Feb. 6, 2018

(54) LINKS

(71) Applicant: Lenovo (Singapore) Pte. Ltd., Singapore (SG)

(72) Inventors: Grigori Zaitsev, Cary, NC (US); Jose Rodolfo Ruiz, Raleigh, NC (US); Rod D. Waltermann, Rougemont, NC (US); Brian Alan Burdette, Apex, NC (US); Joaquin F. Luna, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 548 days.

(21) Appl. No.: 14/330,355

(22) Filed: Jul. 14, 2014

(65) Prior Publication Data

US 2016/0014245 A1    Jan. 14, 2016

(51) Int. Cl.
| | |
|---|---|
| *G04B 47/00* | (2006.01) |
| *G04G 17/02* | (2006.01) |
| *G06F 1/16* | (2006.01) |
| *H04M 1/02* | (2006.01) |
| *G04G 17/08* | (2006.01) |

(52) U.S. Cl.
CPC ............. *G06F 1/163* (2013.01); *G04B 47/00* (2013.01); *G04G 17/02* (2013.01); *G04G 17/083* (2013.01); *H04M 1/02* (2013.01); *H04M 1/0262* (2013.01); *H04M 2001/0204* (2013.01); *H04M 2250/12* (2013.01)

(58) Field of Classification Search
CPC ...... G04G 17/08; G04G 17/083; G04B 47/00; A44C 5/0007; A44C 5/0015; G06F 1/163; H04M 1/02; H04M 1/0262; H04M 2250/12; H04M 2001/0204
See application file for complete search history.

(56) References Cited

U.S. PATENT DOCUMENTS

| | | | | |
|---|---|---|---|---|
| 4,130,987 A | * | 12/1978 | Schickedanz | G04B 19/08 368/282 |
| 4,586,827 A | * | 5/1986 | Hirsch | A61B 5/02438 368/10 |
| 5,081,852 A | * | 1/1992 | Cox | A44C 5/0084 63/3 |

(Continued)

FOREIGN PATENT DOCUMENTS

| | | |
|---|---|---|
| GB | 2388765 A | 11/2003 |
| GB | 2411552 A | 8/2005 |

(Continued)

OTHER PUBLICATIONS

Fairchild Semiconductor, KA317 / LM 317, 3-Terminal Positive Adjustable Regulator 2002 (Rev. 1.2.1) (8 pages).

(Continued)

*Primary Examiner* — Vit W Miska
(74) *Attorney, Agent, or Firm* — Brian J. Pangrle

(57) ABSTRACT

An apparatus can include links where each of the links includes a link-to-link mechanical interface and a link-to-link electrical interface, where the links include a circuitry link and a battery link, where the circuitry link is mechanically coupled to the battery link via at least one pair of link-to-link mechanical interfaces and where the circuitry link is electrically coupled to the battery link via at least one pair of link-to-link electrical interfaces.

16 Claims, 17 Drawing Sheets

(56) References Cited

U.S. PATENT DOCUMENTS

| | | | |
|---|---|---|---|
| 5,872,744 A * | 2/1999 | Taylor | G04G 17/083 224/164 |
| 6,619,836 B1 | 9/2003 | Silvant et al. | |
| 7,152,989 B2 * | 12/2006 | Radley-Smith | A44C 5/0015 345/903 |
| 7,618,260 B2 * | 11/2009 | Daniel | A44C 5/0007 24/311 |
| 8,725,842 B1 * | 5/2014 | Al-Nasser | G04G 17/08 367/11 |
| 9,380,949 B2 * | 7/2016 | Schuessler | A61B 5/02055 |
| 9,454,180 B2 * | 9/2016 | Breedvelt-Schouten | G06F 3/017 |
| 9,541,955 B2 * | 1/2017 | Holtzman | G06F 1/1635 |
| 2001/0043514 A1 | 11/2001 | Kita | |
| 2013/0271350 A1 | 10/2013 | Lyons | |
| 2014/0334083 A1 * | 11/2014 | Bailey | G06F 1/163 361/679.03 |

FOREIGN PATENT DOCUMENTS

| | | | |
|---|---|---|---|
| JP | 2003-261264 A | | 9/2003 |
| JP | 2003-271264 | * | 9/2003 |
| OA | 2013/063276 A1 | | 5/2013 |
| WO | 2001/35173 A1 | | 5/2001 |
| WO | 2008/035993 A1 | | 3/2008 |

OTHER PUBLICATIONS

Watch Links Removal Instructions 2008 (3 pages).
Dembicki, Transmission of Serial Data Using Inductive Data Transfer, 2004 (14 pages).
How to Build a Laser Diode Circuit, 2014 http://www.learningaboutelectronics.com/Articles/Laser.diode.circuit.php (5 pages).
Baker, Microchip Technology, Inc., Analog Design Note, ADN006, 2003 (2 pages).
Ams AG / TAOS, TSL2550 Ambient Light Sensor 2007 (21 pages).
Ams AG / TAOS, TMD2672 Digital Proximity Sensor 2012 (29 pages).
RODE Microphones, Lavalier Microphone, 2011 (16 pages).
Sennheiser, 100-P Series, 2009 (37 pages).
Timex, Watch Manual, 2003 (2 pages).
Seiko, Astron GPS Solar Watch Manual, 2012 (58 pages).
Omega, Watch Operating Instructions, 2013 (24 pages).
Combined Search and Examination Report, UK Application No. GB1512299.7, dated Oct. 30, 2015 (9 pages).
Examination Report, UK Application No. GB1512299.7, dated May 5, 2017 (4 pages).

* cited by examiner

LINKS

TECHNICAL FIELD

Subject matter disclosed herein generally relates to links.

BACKGROUND

Portable devices such as smart phones come preconfigured with a set of features. Where a user desires additional or different features, the user may simply buy a different preconfigured device.

SUMMARY

An apparatus can include links where each of the links includes a link-to-link mechanical interface and a link-to-link electrical interface, where the links include a circuitry link and a battery link, where the circuitry link is mechanically coupled to the battery link via at least one pair of link-to-link mechanical interfaces and where the circuitry link is electrically coupled to the battery link via at least one pair of link-to-link electrical interfaces. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
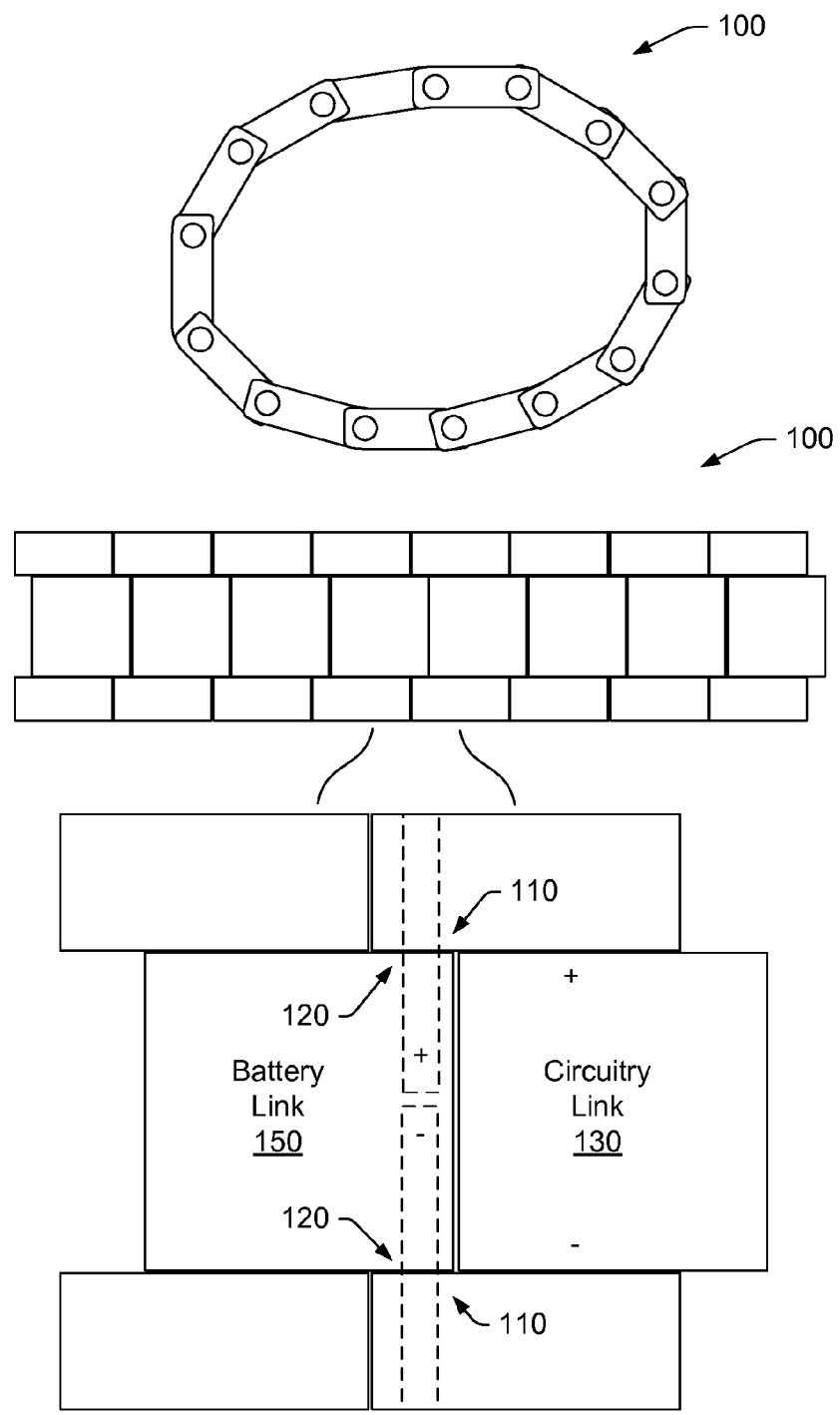
FIG. 1 is a diagram of an example of an apparatus.

FIG. 1 shows an example of an apparatus 100 that includes links where each of the links can include a link-to-link mechanical interface 110 and a link-to-link electrical interface 120, where the links include a circuitry link 130 and a battery link 150, where the circuitry link 130 is mechanically coupled to the battery link 150 via at least one pair of link-to-link mechanical interfaces and where the circuitry link 130 is electrically coupled to the battery link 150 via at least one pair of link-to-link electrical interfaces. In the example of FIG. 1, the apparatus 100 may be formed as a chain, which may be configurable as a loop and/or as a string.

Figure 2:
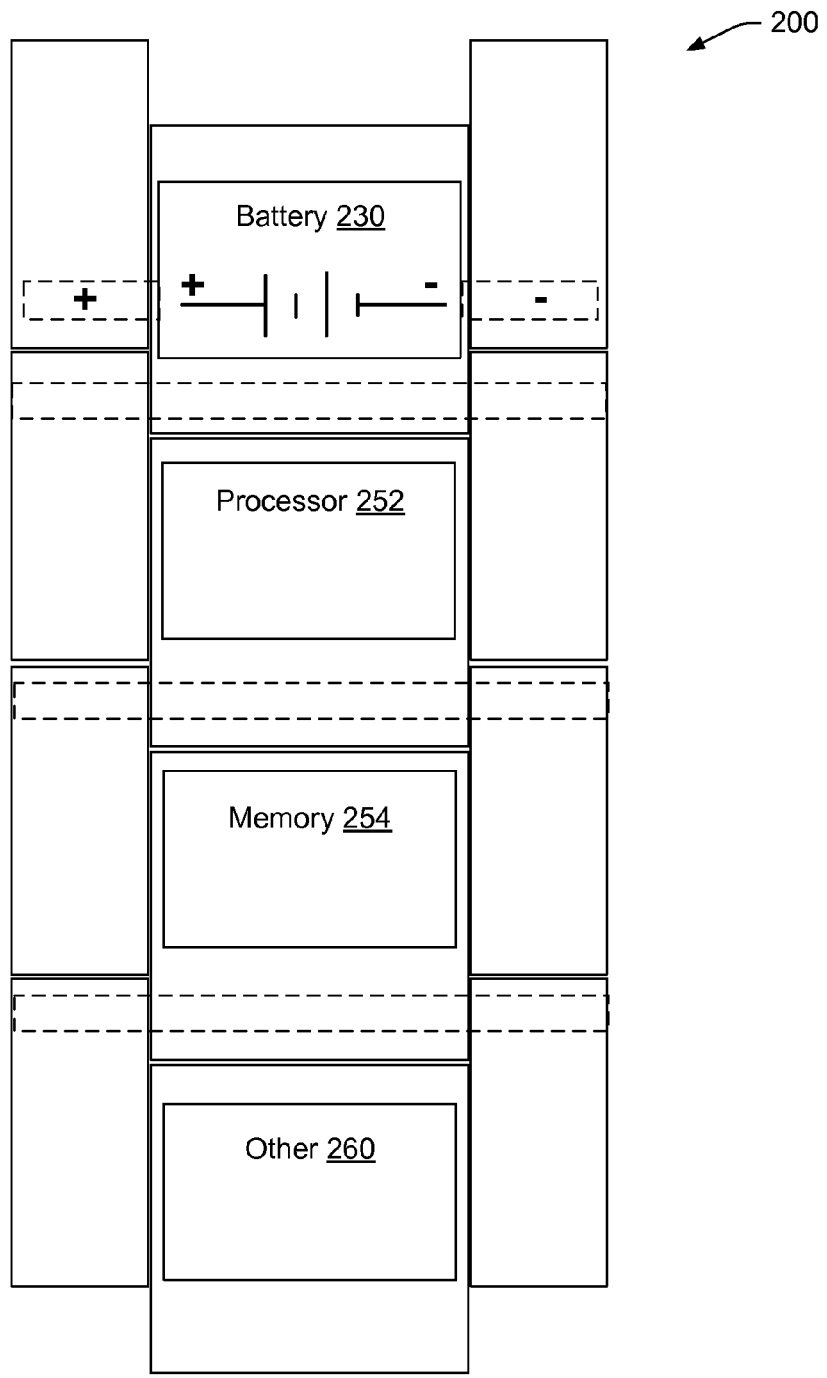
FIG. 2 is a diagram of an example of an apparatus.

FIG. 2 shows an example of an apparatus 200 that includes a link that includes a battery 230, a link that includes a processor 252, a link that includes memory 254 and a link that can include one or more other types of equipment (e.g., circuitry, mechanics, fluidics, etc.). In the example of FIG. 2, the battery 230 may provide power for operation of the processor 252 and the memory 254. As an example, the memory 254 may be accessible to the processor 252, for example, for writing and/or reading information. As an example, the apparatus 100 of FIG. 1 may include one or more features of the apparatus 200 of FIG. 2.

Figure 3:
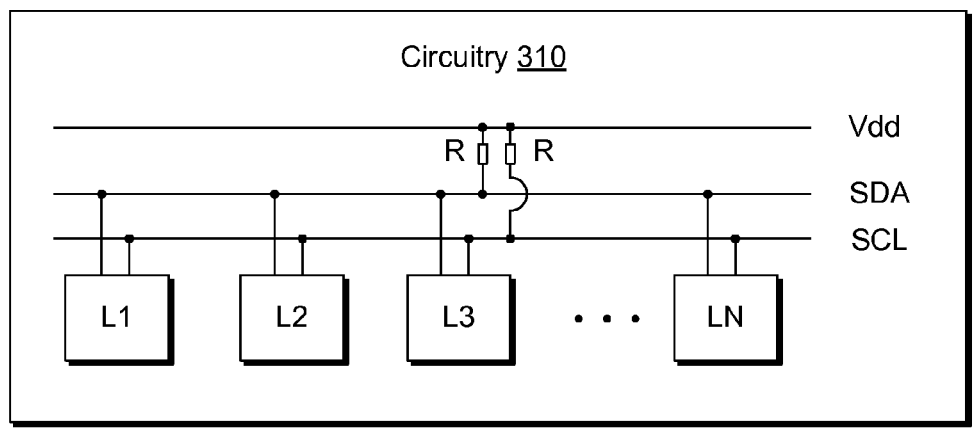
FIG. 3 is a diagram of examples of circuitry.
Figure 3:
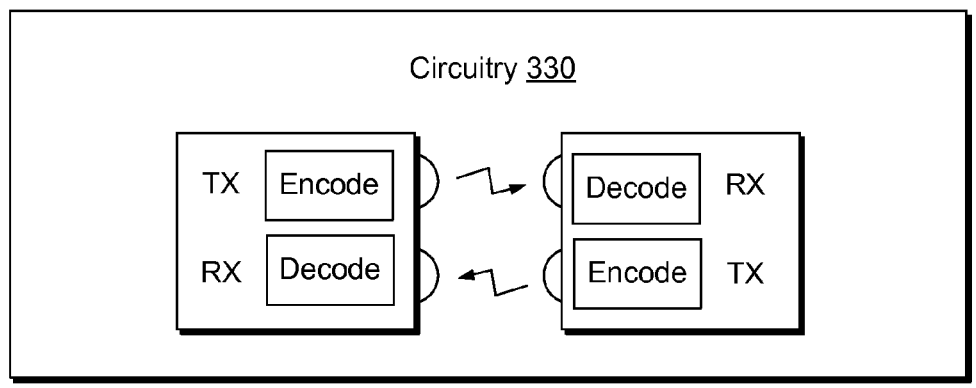
Figure 3:
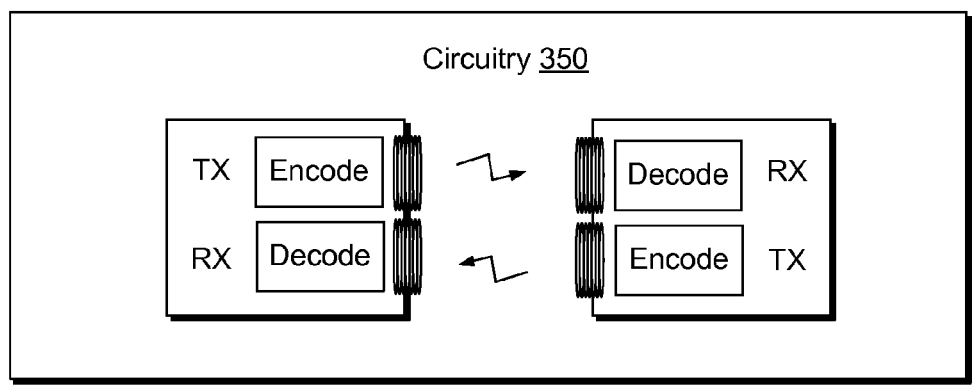

FIG. 3 shows examples of circuitry 310, 330 and 350 that may be used to transmit and receive information. For example, the circuitry 310 may include a powered two-wire bus with a data line (SDA) and a clock line (SCL). As an example, the circuitry 310 may be configured to implement an I$^2$C communication protocol (e.g., an inter integrated circuit protocol). Such circuitry may provide for data signals and clock signals. As an example, such circuitry may be operatively coupled to an I$^2$C bus, a system management bus (SMBus bus), a power management bus (PMBus bus), etc.; noting that a SMBus bus and a PMBus bus may be operative in a manner that includes using various features of an I$^2$C bus.

As shown in the example circuitry 310 of FIG. 3, the SDA line and the SCL line may be operatively coupled to multiple links. Such lines may be operable using a voltage of about 3.3V, supplied via a supply line (Vdd) that includes a plurality of resistors. Such lines may be suitable for implementation of I$^2$C address bit signals (e.g., BIT0, BIT1, BIT2 signals), for example, to provide for addressing circuitry of a link, etc.

As an example, data transfers may be initiated by a microcontroller, as a master or master node. In such an example, the master may generate the serial clock (carried by the SCL), control bus access, generate START and STOP conditions, and determine a number of bytes transferred on a data line (SDA) between START and STOP. As an example, data may be transferred in bytes with the most significant bit being transmitted first. After each byte, an acknowledge bit may follow to allow synchronization between master and slave.

In FIG. 3, the example circuitry 330 can include encode and decode circuitry operatively coupled to an emitter and a detector, respectively. For example, an emitter may be an electromagnetic energy emitter and a detector may be an electromagnetic energy detector. As an example, the circuitry 330 can include at least one line-of-sight emitter and detector pair where the emitter may be part of one link and where the detector may be part of another link (e.g., optionally including one or more optical components such as lenses, mirrors, etc.). As an example, circuitry may be operable via an Infrared Data Association (IrDA) standard. As an example, circuitry may include an infrared optical detector and an infrared optical emitter that can operate in the near infrared range (e.g., about 700 nm to about 1400 nm) of the electromagnetic spectrum. As an example, for optical communication, a modulated IR light beam transmitted by an emitter LED may be received by a silicon photodiode/transistor.

In FIG. 3, the circuitry 350 may include magnetic induction circuitry for transmission and reception of information. For example, circuitry can include controlling current in a conductor to generate a magnetic field. Where another conductor exists within the magnetic field, the magnetic field may generate current in that conductor. In such an approach, information may be transmitted by inducing magnetic flux in one coil to induce magnetic flux in another coil, optionally where an air gap (e.g., or other type of substance gap) may exist between the two coils. As an example, links may include multiple coils. As an example, information may be transmitted from one link to a plurality of links, from one link to another link, from a plurality of links to one link or from a plurality of links to a plurality of links. As an example, a clock signal may be transmitted from one link that includes clock circuitry to one or more links. As an example, links may include circuitry to operate in a bi-directional half duplex mode or other mode.

Figure 4:
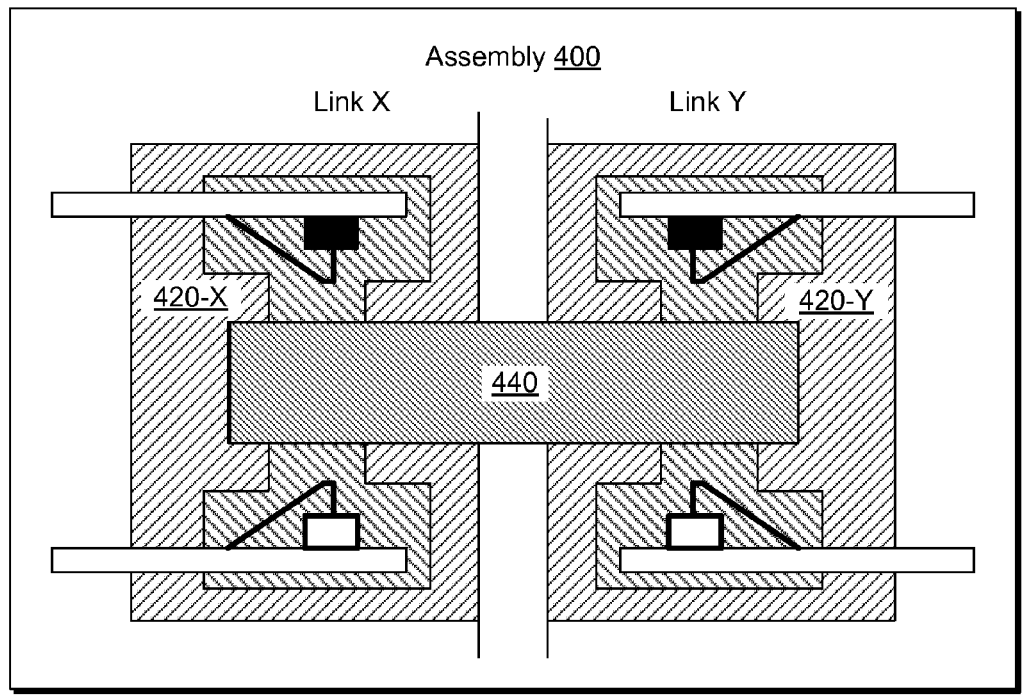
FIG. 4 is a diagram of an example of an assembly.
Figure 4:
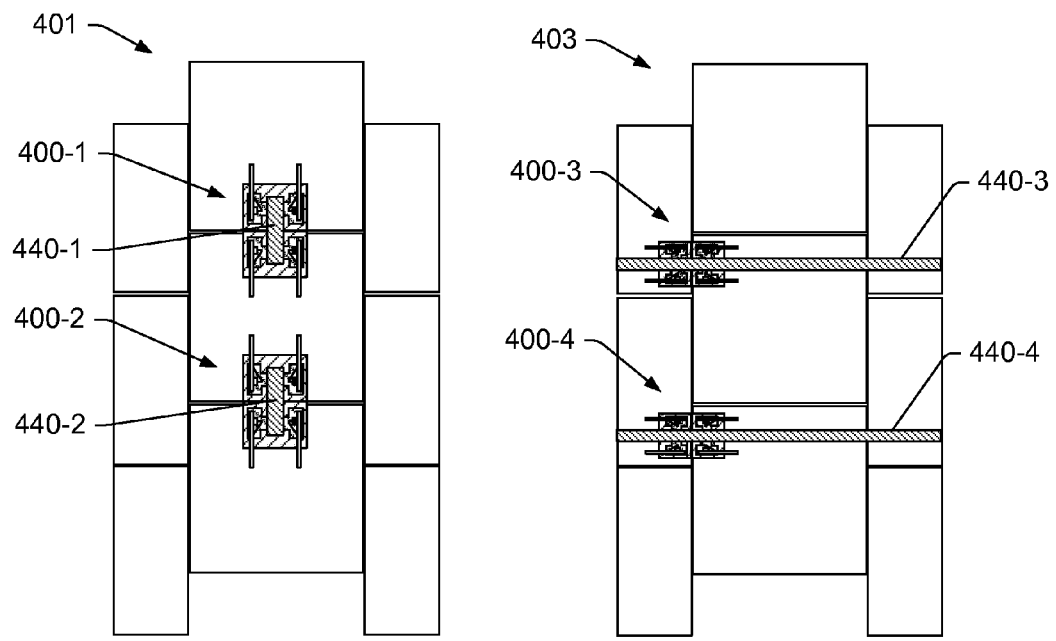

FIG. 4 shows an example of an assembly 400 that includes circuitry 420-X, circuitry 420-Y and a waveguide 440. In such an example, the circuitry 420-X may be associated with a link X and the circuitry 420-Y may be associated with a link Y. In the example of FIG. 4, each of the circuitry 420-X and the circuitry 420-Y includes an emitter and a detector that are directed at the waveguide 440. In such a manner, the waveguide 440 may transmit signals from the circuitry 420-X to the circuitry 420-Y and vice versa. As an example, the emitters and the detectors may operate in the infrared portion of the electromagnetic energy spectrum. Such circuits may be set in a medium that is transparent to transmitted energy. For example, the circuits may be set in one or more resins where at least one of the resins is sufficiently transparent to the transmitted energy. As an example, circuitry may be configured as a photointerrupter adapted for transmission of information. As an example, the circuitry 420-X and the circuitry 420-Y may be movable with respect to each other and, for example, the waveguide 440.

FIG. 4 also shows examples of links 401 and links 403 that include multiple instances of an assembly such as the assembly 400. As to the links 401, an assembly 400-1 and an assembly 400-2 are shown where each includes a waveguide 440-1 and 440-2, respectively. As to the links 403, an assembly 400-3 and an assembly 400-4 are shown where each includes a waveguide 440-3 and 440-4, respectively. In the example links 403, the waveguides 440-3 and 440-4 may be configured as pins that can mechanically couple links. For example, a pin may be made of a material such as a resin that can transmit electromagnetic energy. As an example, a link may include a plurality of emitters and a plurality of detectors. For example, a link may include circuitry to communicate with a link on one side and include circuitry to communicate with a link on another side.

Figure 5:
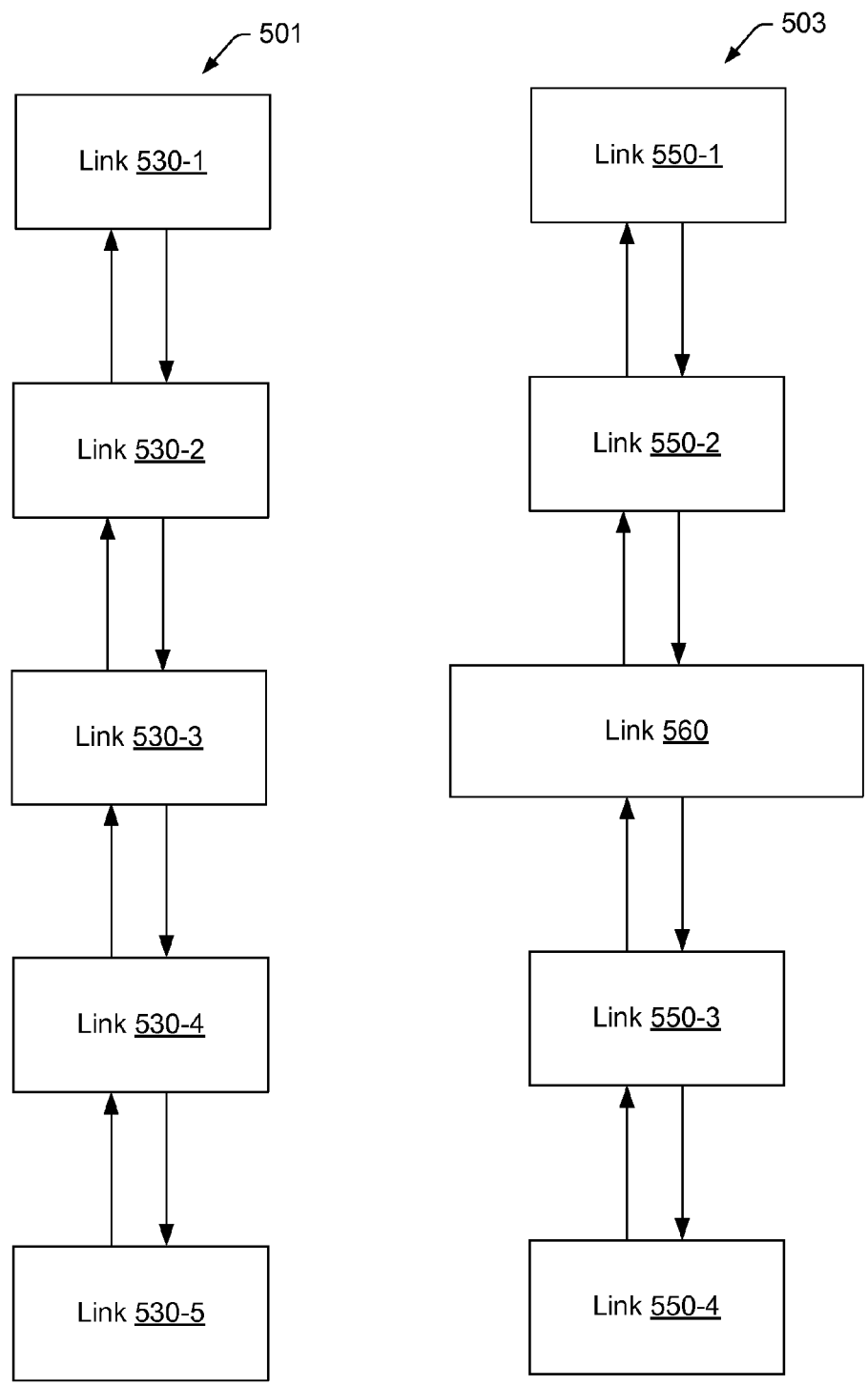
FIG. 5 is a diagram of examples of apparatuses.

FIG. 5 shows an example of a chain 501 and an example of a chain 503. The chain 501 includes links 530-1, 530-2, 530-3, 530-4 and 530-5. The links 530-1, 530-2, 530-3, 530-4 and 530-5 may be operatively coupled via a bus, which may be, for example, a two-wire bus. As an example, two or more of the links 530-1, 530-2, 530-3, 530-4 and 530-5 may include circuitry for receiving and/or transmitting information via the bus.

As to the chain 503, it includes links 550-1, 550-2, 550-3, 550-4 and 560. The link 560 may be a main link (e.g., a tier 0 link) that can query one or more of the links 550-2 and 550-3 that are next to it (e.g., tier 1 links) for their UIDs. As an example, a tier 1 link may respond to such a query with its own UID, and, for example, pass a UID request further to a tier 2 link. For example, the links 550-1 and 550-4 may be tier 2 links that can send their respective UIDs to a tier 1 link, and further to a mail link. As an example, where requests are sent by a main link, higher tier links may respond with their UIDs such that the main link has information sufficient to determine characteristics (e.g., capabilities, etc.) of links in a chain as well as, for example, order of links in a chain (e.g., to know what links make up a chain and their plug order).

As an example, a method may include handshaking where, after handshaking, a locally unique logical address may be assigned to each link so that communications can be addressed to particular link or links in a chain.

As an example, the main link 560 may include memory that stores information such as one or more identifiers, addresses, etc. for links, which may be mechanically coupled and/or communicatively coupled, etc. to the main link 560. As an example, the main link 560 may include memory that stores a history of links that have been mechanically coupled and/or communicatively coupled to the main link 560. As an example, a history of links may be presentable to a user via an interface such a display (e.g., of a main link, a slave link, etc.). Such a history may indicate type of link, time of use of link, etc. As an example, history of links may be transferable from a chain of links to another device via wire and/or wireless communication circuitry.

Figure 6:
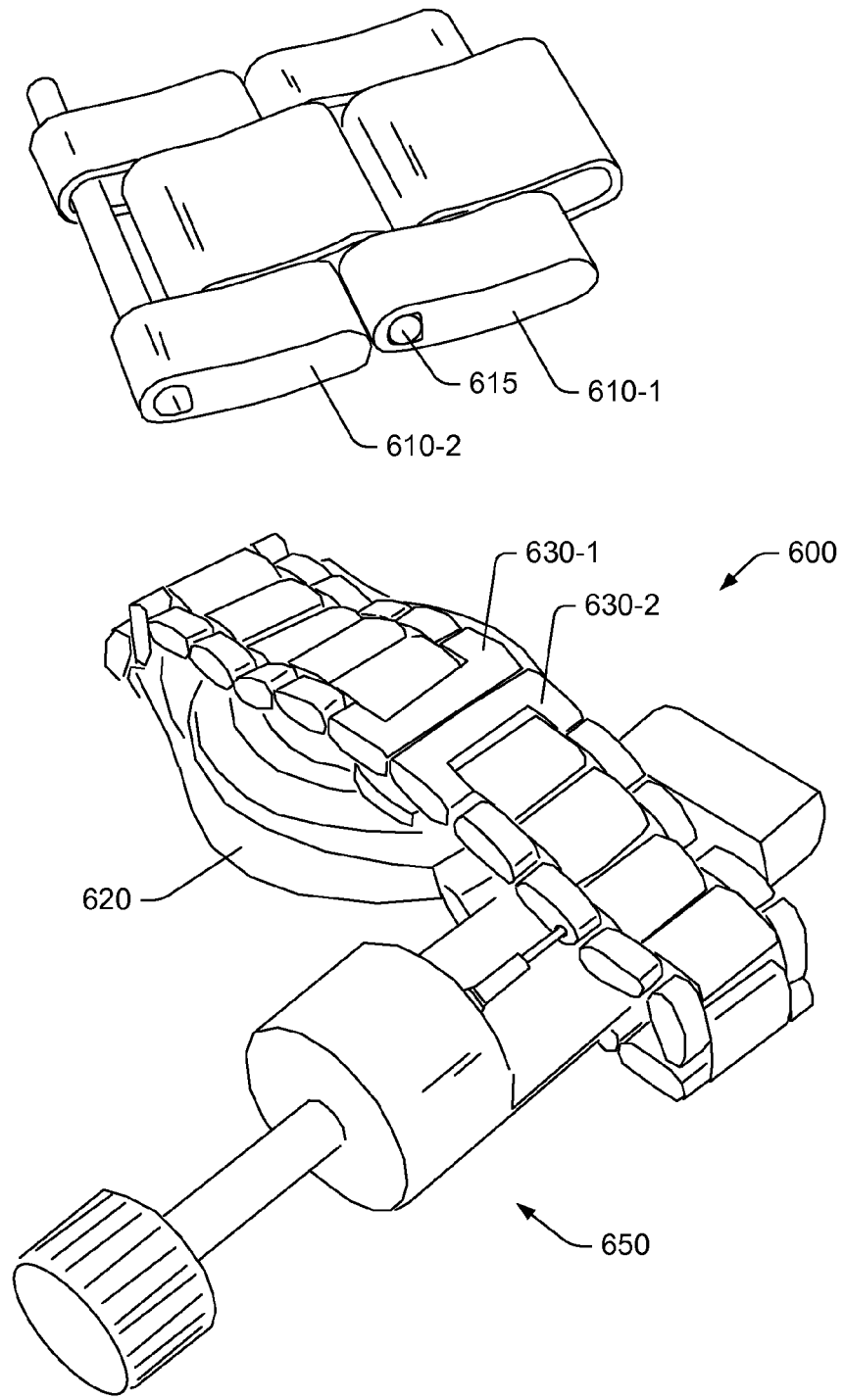
FIG. 6 is a diagram of an example of an apparatus and an example of a tool.

FIG. 6 shows an example of an apparatus 600 that includes links 610, 620 and 630. For example, the links 610 may be configured as links 610-1 and 610-2 that may be mechanically coupled using a pin 615. As an example, a tool 650 may be included as part of a kit that can allow a user to remove, replace, etc. links. For example, the tool 650 may include a driver portion that is set in a holder whereby the driver portion can apply pressure to a pin for movement of the pin and mechanical decoupling of two links. As an example, links may be coupled in a manner such that they can be removed, replaced, etc. without use of a tool. For example, links may include magnets such that the attractive strength is sufficient to maintain coupling of the links yet not so strong that a person can pull two links apart. As another example, a link may include a pressure point that can be pressed to release its mechanically coupling to one or more other links. As an example, a link may include a mechanism that can be slid or rotated with a finger nail to release the link from one or more other links. As an example, a link may be twisted with respect to another link to cause a mechanical coupling to separate, in a predetermined manner (e.g., capable of being recoupled).

As an example, the link 620 may be larger than the links 610 and the links 630 (see, e.g., 630-1 and 630-2) may be clasping links that can be clasped and unclasped to allow for positioning of the apparatus 600 on a wrist of a human arm. As an example, the link 620 may be that of a mechanical and/or electrical watch. For example, consider the link 620 as being a SEIKO® watch, which may be an automatic movement watch, a quartz movement watch, etc. As an example, links may be provided with particular features. In such an example, the links may be suitable for mechanical coupling to a watch to make a "smart" apparatus. In such a manner, an aficionado of mechanical watches can retain a desired mechanical watch yet pair it with a chain of that includes one or more "intelligent" links that form a bracelet for the mechanical watch. As an example, an apparatus may be a hybrid apparatus in that it includes a mechanical watch and a chain with at least one link that includes circuitry.

Figure 7:
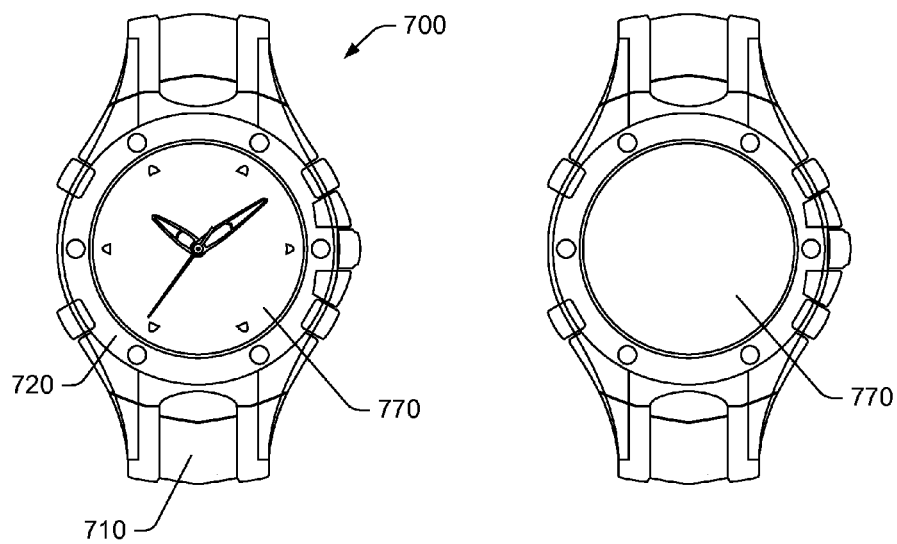
FIG. 7 is a diagram of an example of an apparatus and examples of displayable information.
Figure 7:
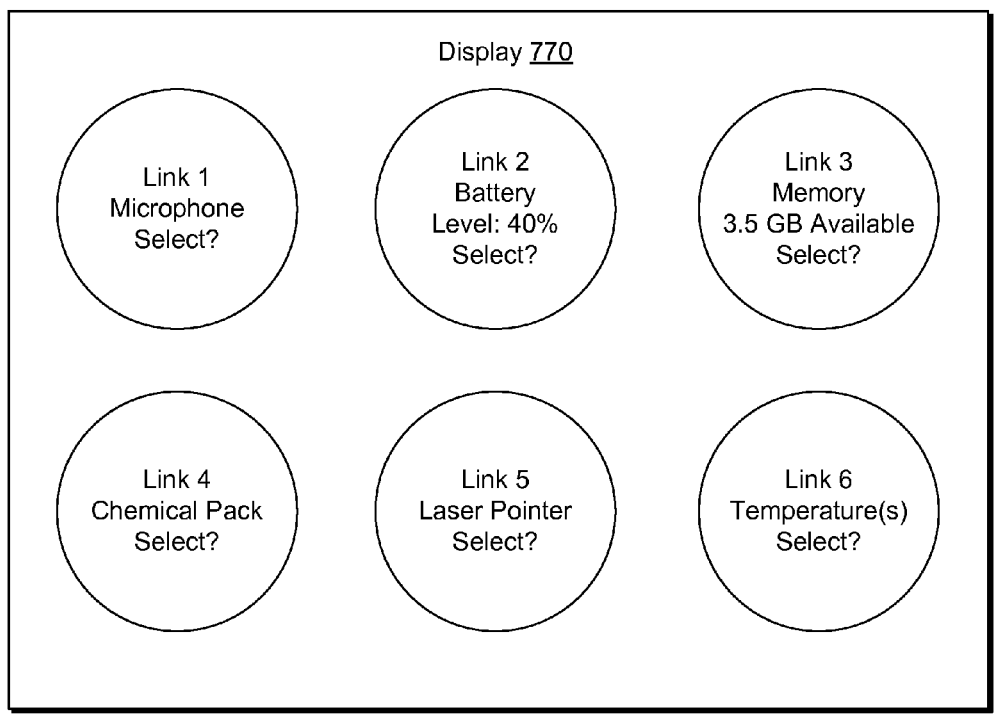

FIG. 7 shows an example of an apparatus 700 that includes links 710 that are mechanically coupled to a link 720 that includes a display 770. In such an example, the link 720 may be controlled via one or more buttons, touches to a touch sensitive surface, via voice, etc. to display information to the display 770. For example, link 1 of the links 710 may include microphone circuitry, link 2 of the links 710 may include a battery, link 3 of the links 710 may include memory, link 4 of the links 710 may include a chemical pack, link 5 of the links 710 may include a laser pointer, and link 6 of the links 710 may include temperature sensing circuitry.

As an example, the display 770 may be a touch sensitive display and/or may be controllable via one or more buttons of the apparatus 700. As an example, a user may navigate a menu via successive touches, etc. where, for example, successive touches act to render information to the display 770 as to successive links in a chain. As an example, a selection may be made via a double touch, a touch and hold, or other input. As an example, where a microphone link is selected, the display 770 may render information as to one or more settings of the microphone. As an example, where a battery link is selected, the display 770 may render information as to one or more statuses of the battery (e.g., percentage power remaining, etc.). As an example, where a memory link is selected, the display 770 may render information as to one or more aspects of the memory (e.g., reset, available memory, memory used for a particular purpose, etc.). As an example, where a chemical pack link is selected, the display 770 may render information as to one or more settings of the chemical pack. As an example, where a laser pointer link is selected, the display 770 may render information as to one or more settings of the laser pointer. As an example, where a temperature link is selected, the display 770 may render information as to one or more settings of the temperature link.

As an example, a temperature link may be configured with multiple temperature sensors. For example, consider an inward facing sensor and an outward facing sensor such that a skin temperature and an external, ambient temperature may be sensed. In such an example, the apparatus 700 may render multiple temperatures, a temperature differential, temperature history, etc., to the display 770.

Figure 8:
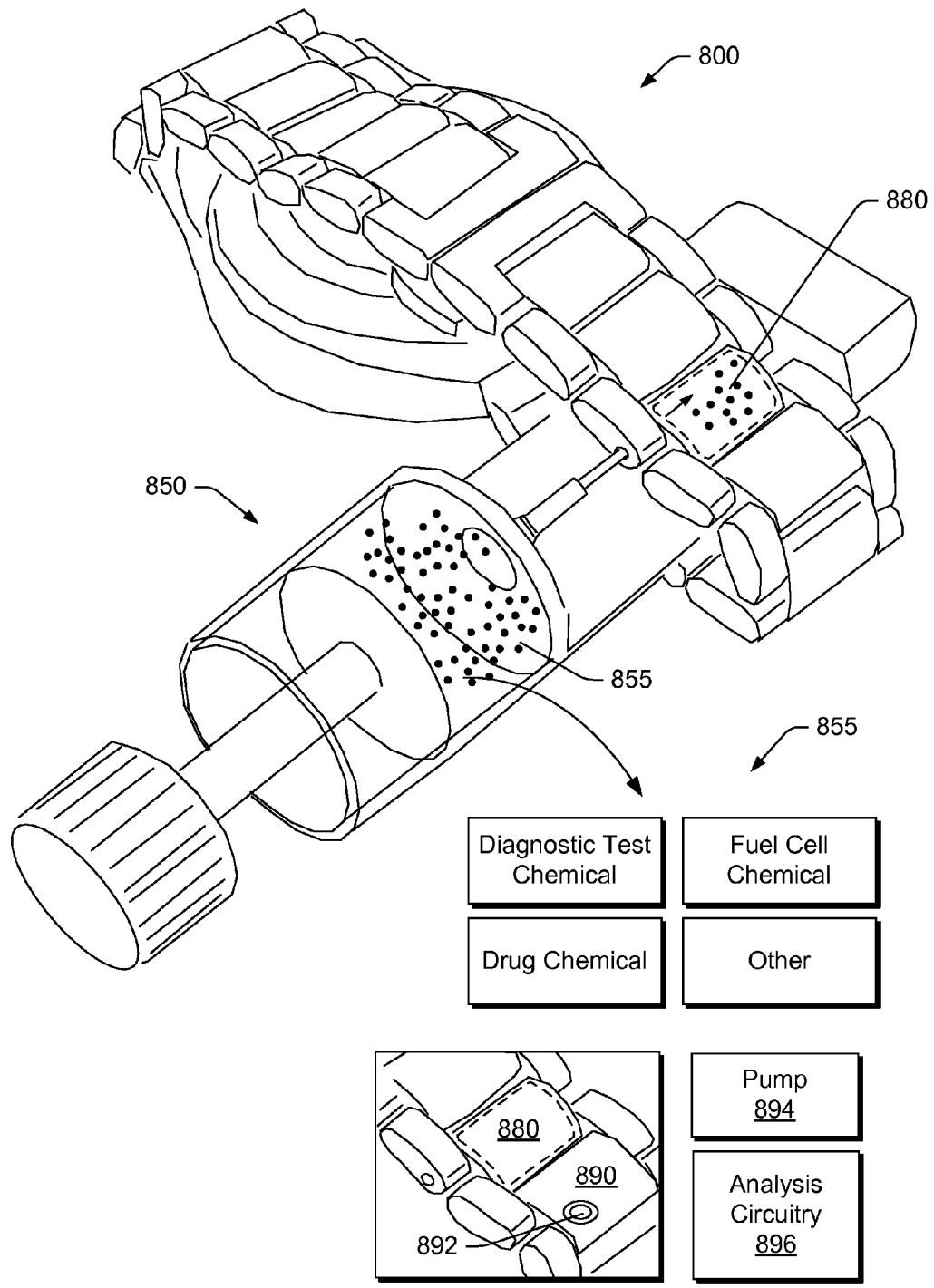
FIG. 8 is a diagram of an example of an apparatus and an example of a tool.

FIG. 8 shows an example of an apparatus 800 that includes a reservoir link 880 that may optionally be replenishable via an injection tool 850, which may include, for example, a syringe (e.g., a chamber and a hollow needle). For example, the injection tool 850 may inject a substance 855 into the reservoir link 880. As an example, a reservoir link may be replaceable, disposable, etc. For example, once depleted of a substance, a reservoir link may be removed and replaced with a "full" reservoir link.

As an example, one or more links of the apparatus 800 may consume a substance contained in a reservoir of the reservoir link 880. Such a substance may be liquid, solid, slurry, emulsion, gas, etc. As an example, where the reservoir link 880, or another link, includes circuitry that can monitor a level of the substance (e.g., volume, pressure, mass, etc.), a notification may be issued by the apparatus 800 to refill, replenish, etc. the substance. For example, monitoring circuitry may compare a sensed level to a threshold level to trigger a notification where the sensed level is less than the threshold level. As an example, a link may include a gauge that can visually display a level of a substance in a reservoir link (e.g., akin to a fuel gauge, etc.).

As an example, the reservoir link 880 may include a reservoir for a diagnostic test chemical, a fuel cell chemical, a drug chemical or other substance. As an example, a reservoir link may operate in conjunction with one or more other links. For example, a reservoir link may release a substance into the air while another link samples the air (e.g., via suction, emission of a beam, etc.). In such an example, the substance may react with one or more components in the air and sampling may be performed to analyze reaction products. As an example, a sampling link 890 may include a port 892, a pump 894 (e.g., suction mechanism) to capture reaction products, for example, for analysis by analysis circuitry 896 of the sampling link 890 or optionally one or more other links.

As an example, where an agent is believed to be in the air, a sampling link may sample the air and analyze the air to determine whether the agent is present (e.g., consider pollen, dust, chemical agents, etc.). As an example, a sampling link may include a window where sampled material can be seen, which may turn a particular color depending on one or more reactions (e.g., to indicate concentration, pH, etc.). As an example, a sampling link may include a microfluidic pump that may draw in a sample to a chamber, a conduit, etc. and that may optionally evacuate a chamber, a conduit, etc. to prepare the sampling link for an analysis of a subsequent sample.

As shown in FIG. 8, the reservoir link 880 may include a reservoir that can hold a chemical for a fuel cell. In such an example, the chemical may be reacted to generate energy, which may be used to power circuitry, mechanics, etc. of one or more other links.

As an example, a link may include a flow path such as a lumen of a conduit that can receive air, water, or another substance. As an example, a link may include a "lab on a chip" (LOC). A LOC can include components for performing one or more functions on a single chip, which may have footprint dimensions of the order of millimeters to about a centimeter. As an example, an LOC may be configured for handling of relatively small fluid volumes (e.g., optionally of the order of pico liters).

As an example, one or more chemicals may be included in a link (e.g., in a chamber, a substrate, etc.). A link that includes one or more chemicals that may be used in a reaction (e.g., as reactants) may be referred to as a chemical reservoir link. As an example, such a link may include sensor circuitry to sense, for example, air quality, breath, etc. As an example, fluid may flow in a link via an open ended tube, for example, for an analysis of the fluid. As an example, fluid may flow in a link to a sensor (e.g., a sensing surface, etc.) for an analysis of the fluid.

Figure 9:
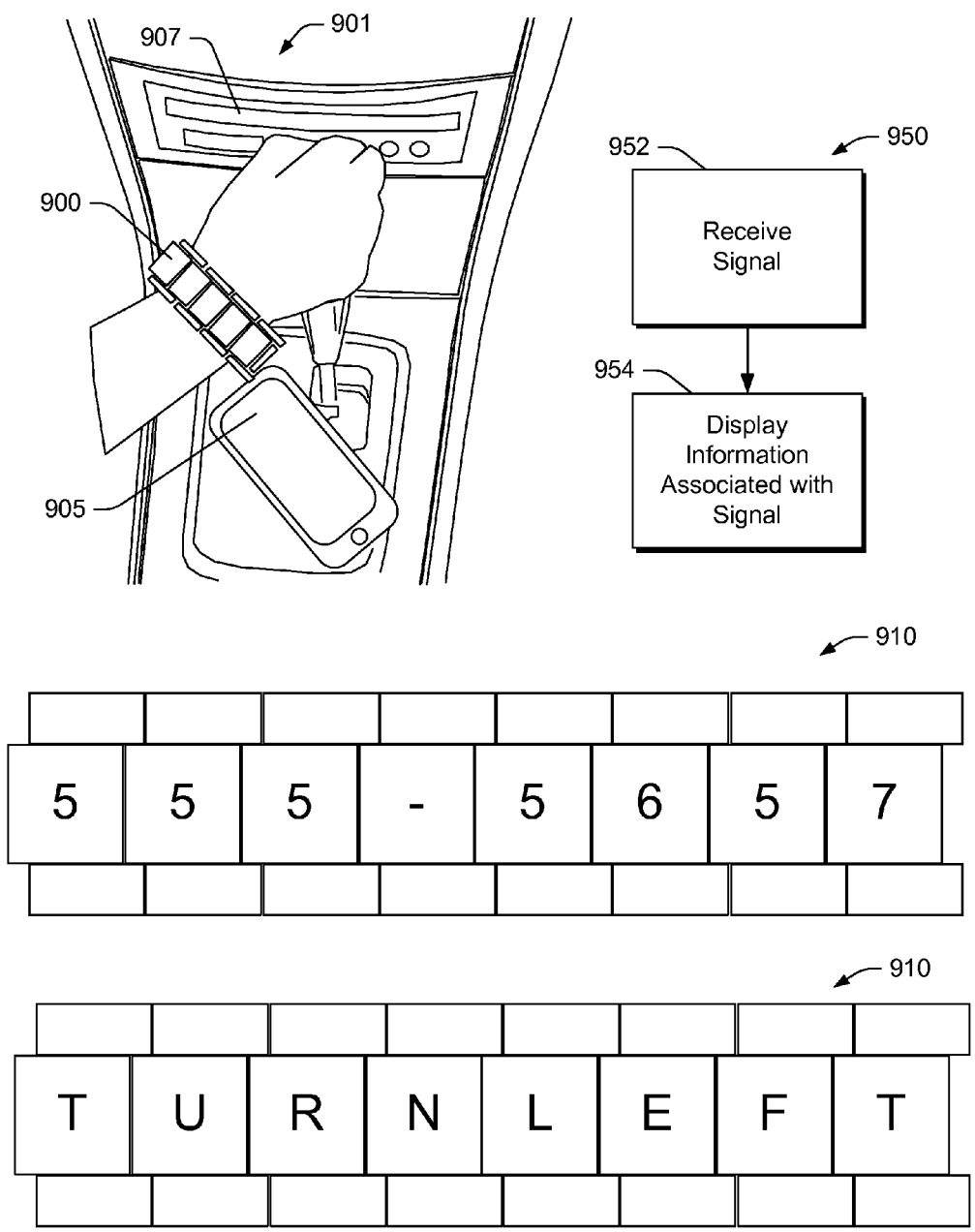
FIG. 9 is a diagram of an example of an apparatus and an example of a method.

FIG. 9 shows an example of an apparatus 900 in an environment that includes other electronics such as a phone 905 and vehicle electronics 907. FIG. 9 also shows an example of a method 950 that includes a reception block 952 for receiving a signal and a display block 954 for displaying information associated with the signal. For example, the apparatus 900 may receive a signal from the phone 905 responsive to a call being received by the phone 905. In such an example, the apparatus 900 may include a series of display links that can display a phone number, a name, etc. as associated with the call received by the phone 905 (see, e.g., "555-5657" as displayed by a series of links 910). As an example, the apparatus 900 may include wireless communication circuitry such as Bluetooth® circuitry where it may pair with one or more other devices such as, for example, the phone 905. As another example, the apparatus 900 may receive a signal from GPS circuitry, which may be of the phone 905, of the vehicle electronics 907 or other electronics. In such an example, the apparatus may include a series of display links that can display GPS information such as, for example, directions, mapped locations, etc. (see, e.g., "TURN LEFT" as display by the series of links 910). As an example, the apparatus 900 may include one or more links with phone circuitry and/or GPS circuitry and optionally include a series of display links such as the links 910.

As an example, a driver of a vehicle may operate the vehicle using one or more hands while wearing an apparatus such as the apparatus 900. For example, FIG. 9 illustrates a driver operating a shifter of a vehicle while being able to see information that may be displayed via a series of display links of the apparatus 900 without interfering with the driver's use of the shifter. As an example, the apparatus 900 may include an accelerometer and/or a gyroscope, which may provide for directional information as to how the apparatus 900 may be oriented, for example, with respect to gravity. In such an example, the apparatus 900 may select to render information to one or more display links based on orientation with respect to gravity. For example, if the driver's hand is so positioned on the shifter, the apparatus 900 may determine that display links facing upwardly with respect to gravity should be selected for display of information.

As an example, an apparatus may render information to a series of display links in a marquee fashion, for example, with a scroll speed. As an example, an apparatus may determine whether a user is wearing the apparatus in a clockwise or counterclockwise orientation. In such an example, the apparatus may optionally control orientation of letters, numbers, symbols, etc. and, for example, direction of scrolling if a marquee functionality is enabled. As an example, direction of scrolling may be determined based on language of characters to be displayed. For example, some languages are read from left to right while others are read from right to left. As an example, an apparatus may include circuitry to determine orientation of itself with respect to a wearer (e.g., as a wrist band) and to determine how information is best rendered to one or more display links.

Figure 10:
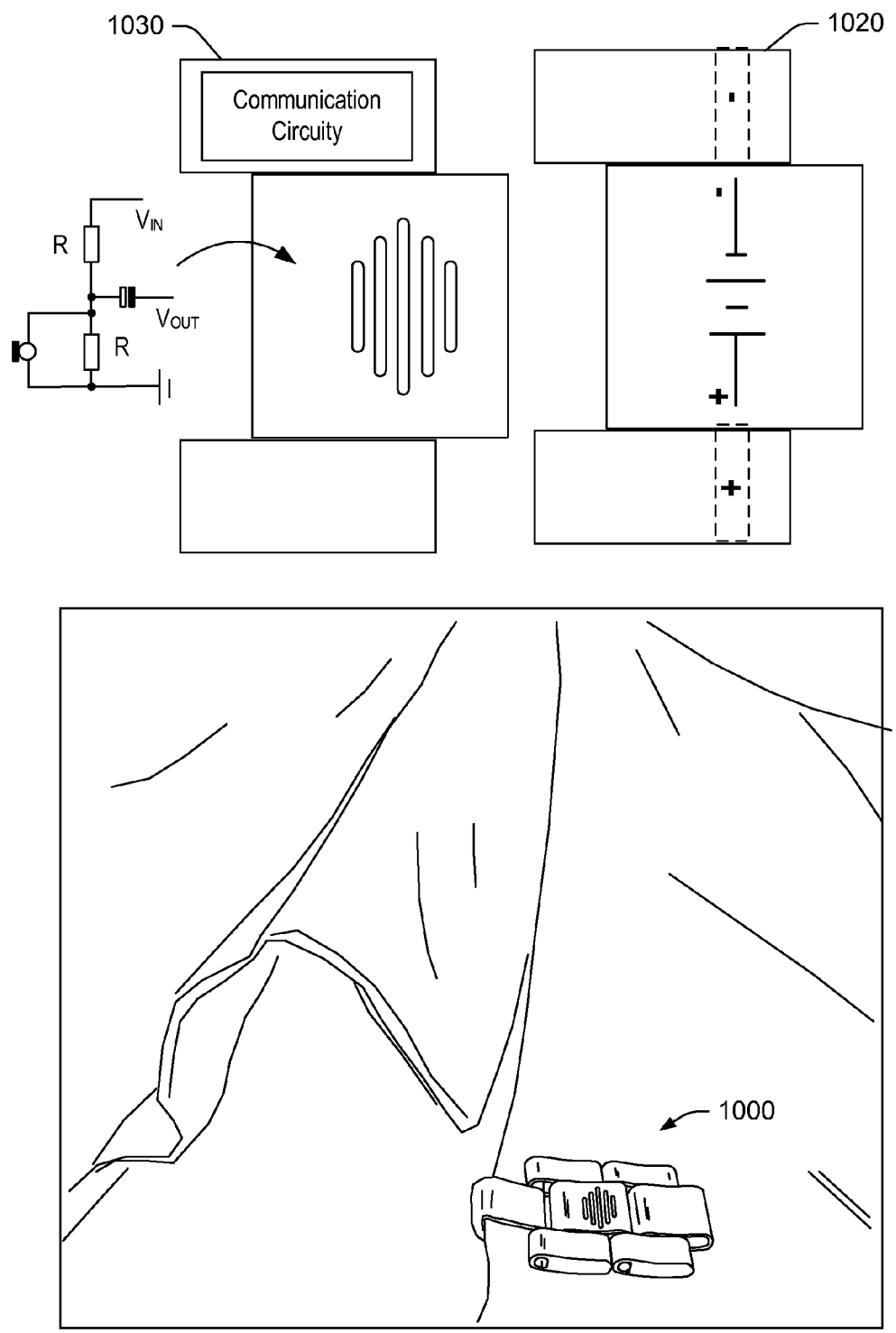
FIG. 10 is a diagram of an example of an apparatus that includes a microphone link.

FIG. 10 shows an example of an apparatus 1000 that includes a battery link 1020 and a microphone link 1030. As shown, the apparatus 1000 may include a clip feature such that the apparatus 1000 may be clipped onto a piece of clothing. For example, the apparatus 1000 may include a lapel clip such that it can function as a lapel microphone. In the example of FIG. 10, the microphone link 1030 includes microphone circuitry, which may be cermet microphone circuitry, and includes communication circuitry that can provide for wireless communication of signals sensed by the microphone circuitry. As shown, the battery link 1020 may be mechanically and electrically coupled to the microphone link 1030 to provide power to the microphone circuitry and/or the communication circuitry. As an example, other arrangements of circuitry can include a microphone link with a battery, a battery link with communication circuitry, a microphone link with a battery and communication circuitry, a communication circuitry link, etc. As an example, the apparatus 1000 may be part of a chain of links where it may be mechanically decoupled from and recoupled to the chain of links. As an example, the communication circuitry may be wireless communication circuitry that may communicate with one or more links of a chain, a base unit of a public address system (PA system), etc.

As an example, the apparatus 1000 may be configured with Bluetooth® communication circuitry that may be paired with another device such as, for example, a phone. In such an example, the apparatus 1000 may function as a microphone for a phone. As an example, an apparatus may include a microphone link and a speaker link that may be detachable and reattachable with respect to a chain of links. Such links may optionally include circuitry to function as "hands-free" components for a phone (e.g., via Bluetooth® circuitry).

As an example, a link may include an antenna and an RF transceiver. As an example, such a link may be configured to receive and/or transmit information. Such information may be transmitted from and/or received by another device (e.g., optionally be another link) that includes an antenna and an RF transceiver.

Figure 11:
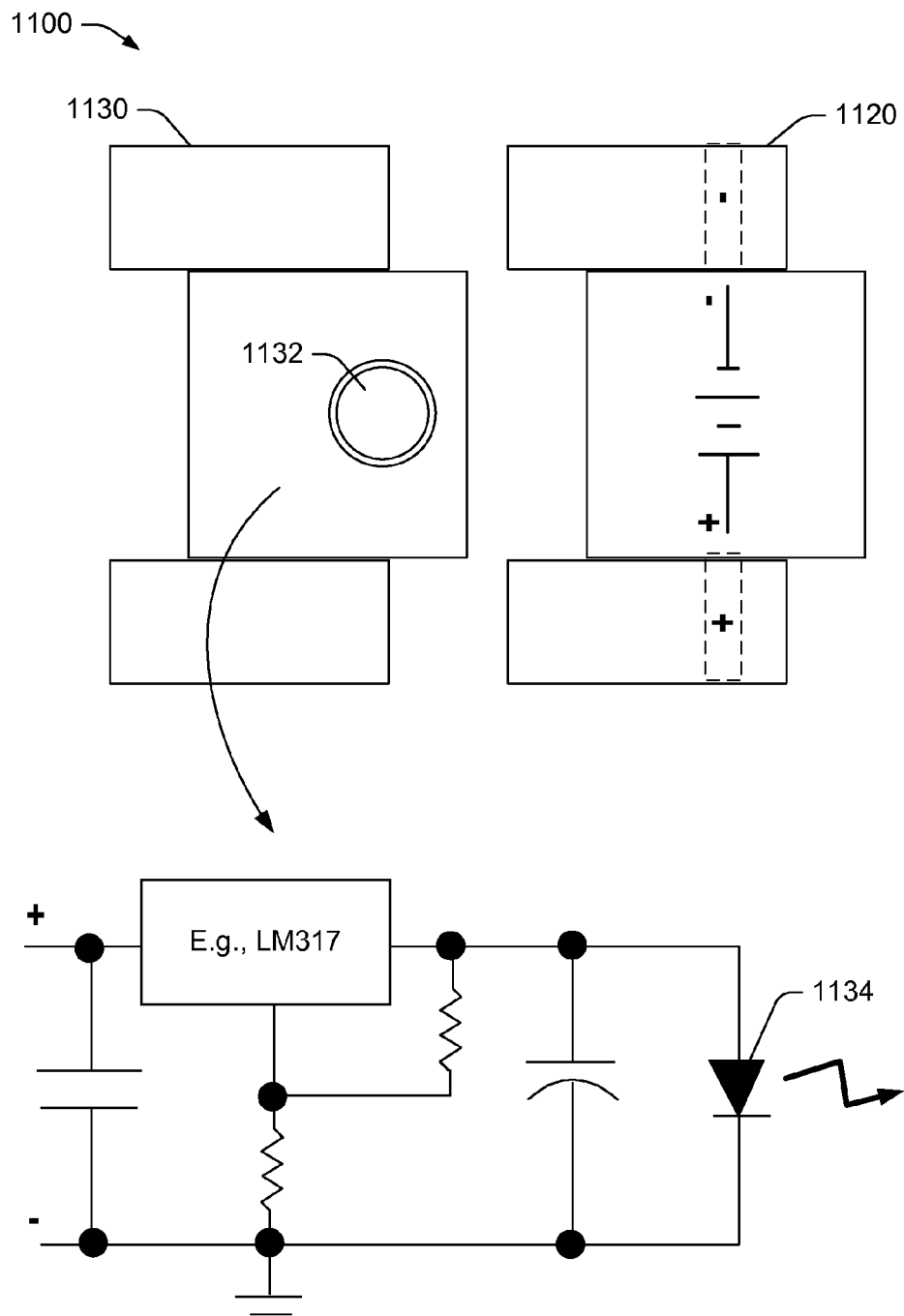
FIG. 11 is a diagram of an example of a laser link.

FIG. 11 shows an example of an apparatus 1100 that includes a battery link 1120 and a laser link 1130. As an example, such a laser link 1130 may be implemented for one or more purposes such as, for example, signaling, vision/illumination, spotting, chemical analysis, distance measurement, etc. As shown, the laser link 1130 can include a port 1132, which may include one or more optical elements for guiding a laser beam as emitted by a laser diode 1134. As shown, the laser diode 1134 may be supplied with a regulated voltage (see, e.g., a LM317 circuit) with power supplied by a battery, which may be included in the laser link 1130 and/or in the battery link 1120 (e.g., per the apparatus 1100). As an example, the laser link 1130 may include touch sensitive circuitry that can be touched by a human finger to cause the laser diode 1134 to turn on and to turn off. As an example, another link in a chain of links may be provided with circuitry that can control state of the laser diode 1134, optionally via supply of power from one or more batteries (e.g., consider supply of power from the battery link 1120 being switched by such circuitry).

Figure 12:
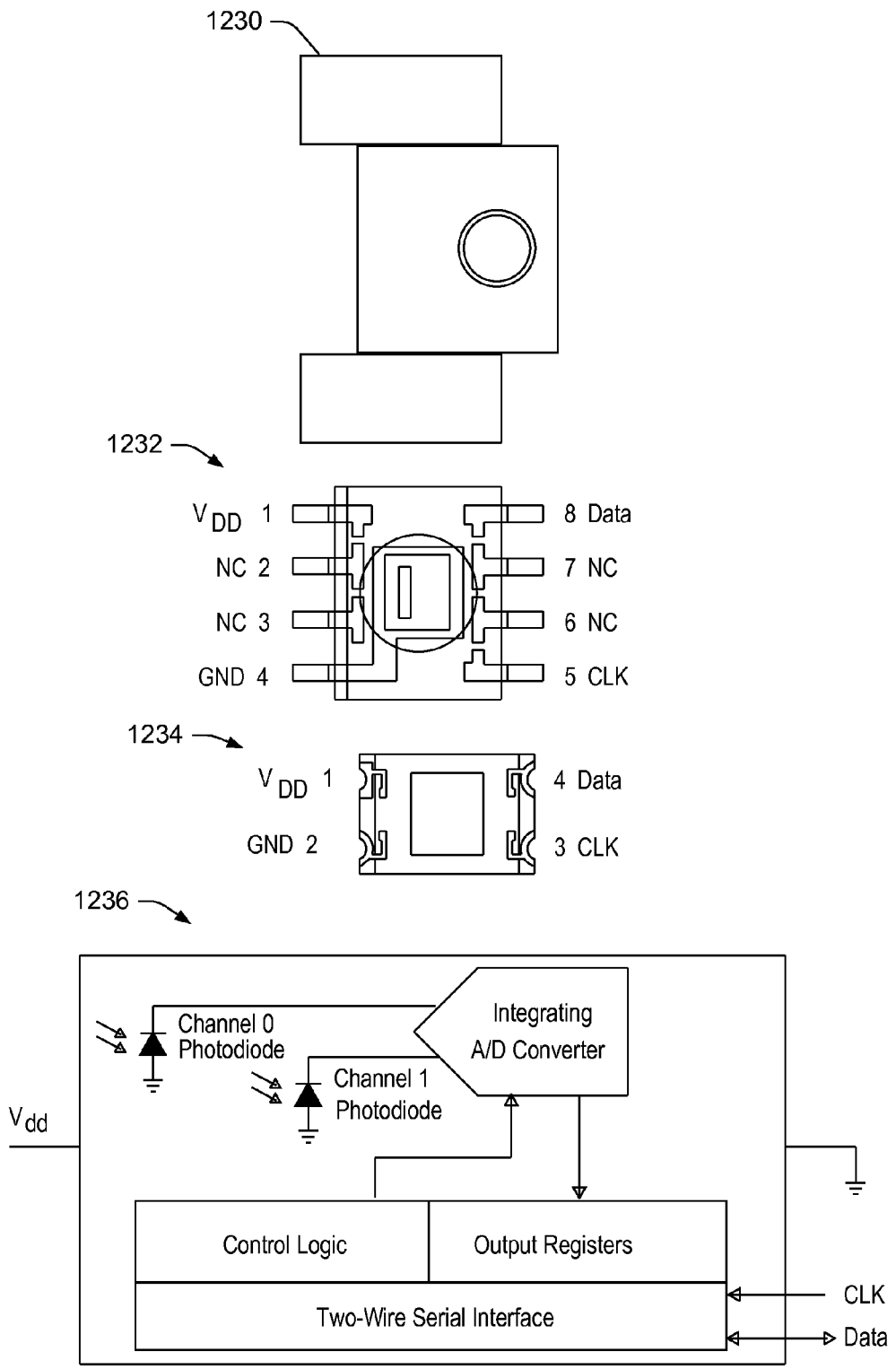
FIG. 12 is a diagram of an example of a detector link.

FIG. 12 shows an example of a link 1230 that may be a link in a chain of links. As shown, the link 1230 can include one or more types of circuitry. For example, the link 1230 can include detector circuitry 1232 and/or detector circuitry 1234. As an example, the link 1230 may include detector circuitry 1236, which is shown as including one or more photodiodes operatively coupled to an integrating analog to digital converter. Such circuitry may include control logic, output registers and a two-wire serial interface, for example, for clock and data signals.

As an example, the link 1230 may include digital-output light sensing circuitry. Digital output from such a link may be used, for example, in control of display backlighting, display contrast control, camera exposure control, lighting controls, etc.

As an example, the link 1230 may include ambient light detection circuitry, chemical detection circuitry (e.g., using EM spectroscopy), camera circuitry, video circuitry, color sensing circuitry, etc.

Figure 13:
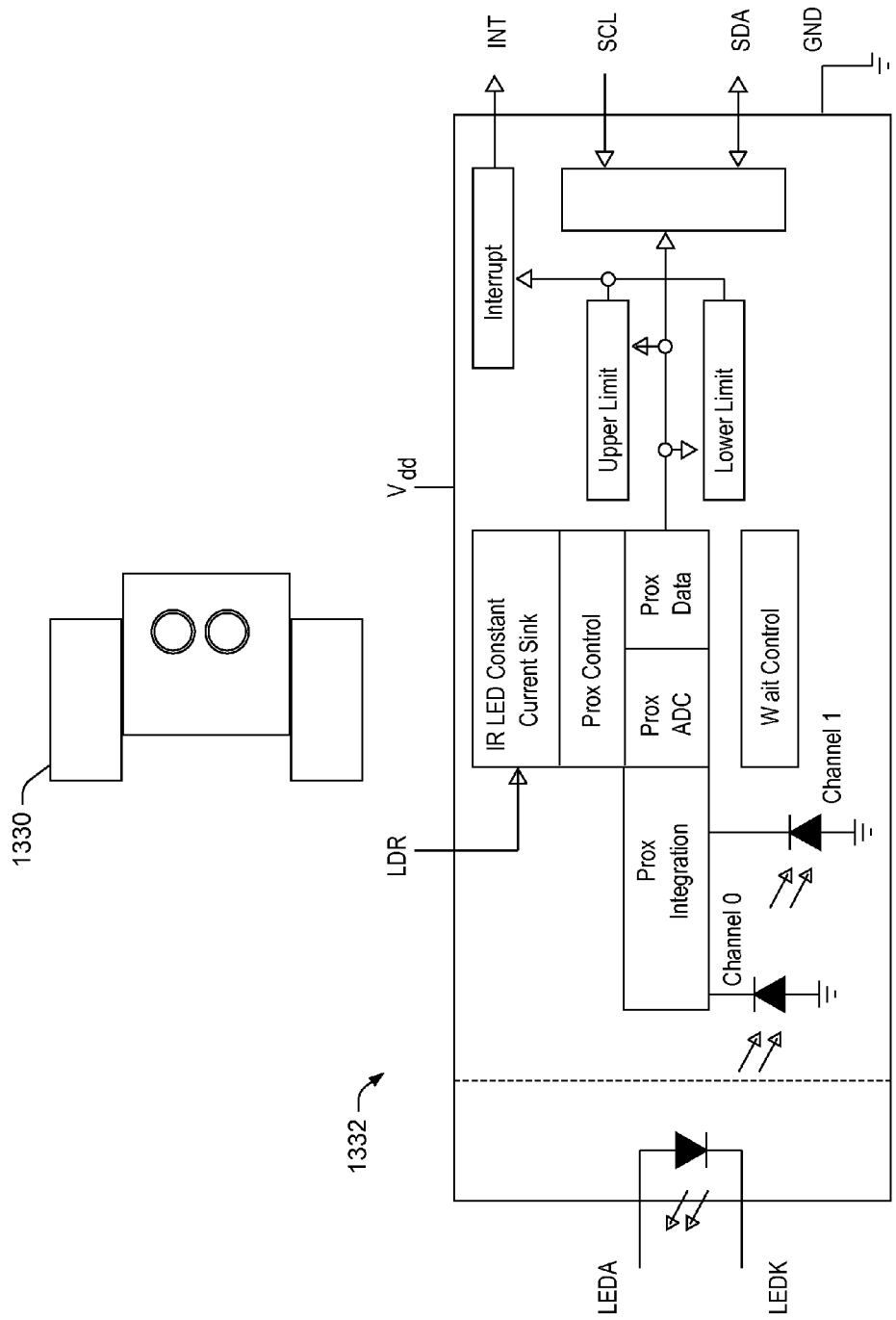
FIG. 13 is a diagram of an example of an emitter and detector link.

FIG. 13 shows an example of a link 1330 that can include emitter and detector circuitry 1332. As an example, the circuitry 1332 can include an 850-nm IR LED, LED driver circuit, and proximity detection engine. As shown, the circuitry 1332 includes an internal LED driver (LDR) pin that is externally connected to the LED cathode (LEDK) to provide a controlled LED sink current. As an example, a number of LED pulses may be programmed (e.g., from 1 to 255 pulses), for example, to allow different distances to be registered (e.g., as proximity distances). As shown, the circuitry 1332 includes a separate pin for level-style interrupts. For example, when interrupts are enabled and a pre-set value is exceeded, the interrupt pin may be asserted and remain asserted until cleared (e.g., by controlling firmware). Such an interrupt feature can alleviate a need to poll a sensor for a proximity value. As an example, an interrupt may be generated when the value of a proximity conversion exceeds either an upper or lower threshold. As an example, a programmable interrupt persistence feature may allow for setting a parameter to determine how many consecutive exceeded thresholds are necessary to trigger an interrupt.

As an example, the link 1330 may be provided as an input device. For example, consider a user placing a finger proximate to the emitter/detector to thereby cause circuitry of the link 1330 to sense proximity of the finger. Depending on a threshold, where a finger is at a particular distance, the circuitry may consider that distance as corresponding to an input command. As an example, consider a user waving a finger over the emitter/detector a number of times to thereby cause a number of consecutive events to be registered, which may, in turn, cause issuance of a trigger (e.g., to trigger an interrupt, etc.). As an example, a link may include emitter/detector circuitry that can register user input such as user gestures that may be made with respect to the link. As an example, four consecutive passes over the link within a time window may cause issuance of a first instruction while two consecutive passes over the link within the time window may cause issuance of a second, different instruction. As an example, such instructions may instruct one or more links of a chain of links.

Figure 14:
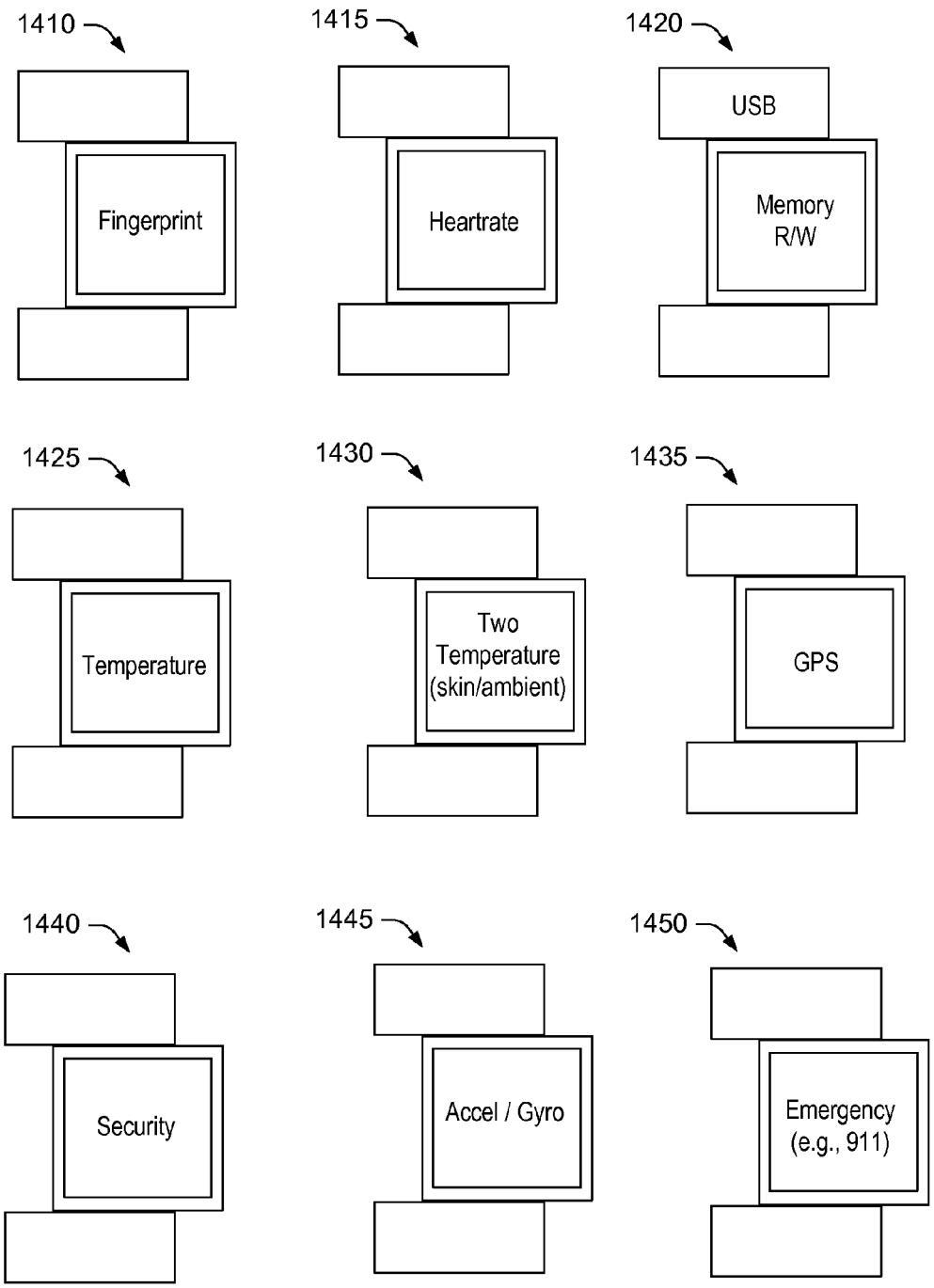
FIG. 14 is a diagram of examples of links.

FIG. 14 shows various examples of links, including a fingerprint reader link 1410, a heart rate sensor link 1415, a memory link 1420 with optionally USB interface, a temperature sensor link 1425, a dual temperature sensor link 1430, a GPS link 1435, a security link 1440 (e.g., TPM, etc.), an accelerometer and/or gyroscope link 1445 (e.g., for gestures, orientation, etc.), and an emergency link 1450 (e.g., "911").

Figure 15:
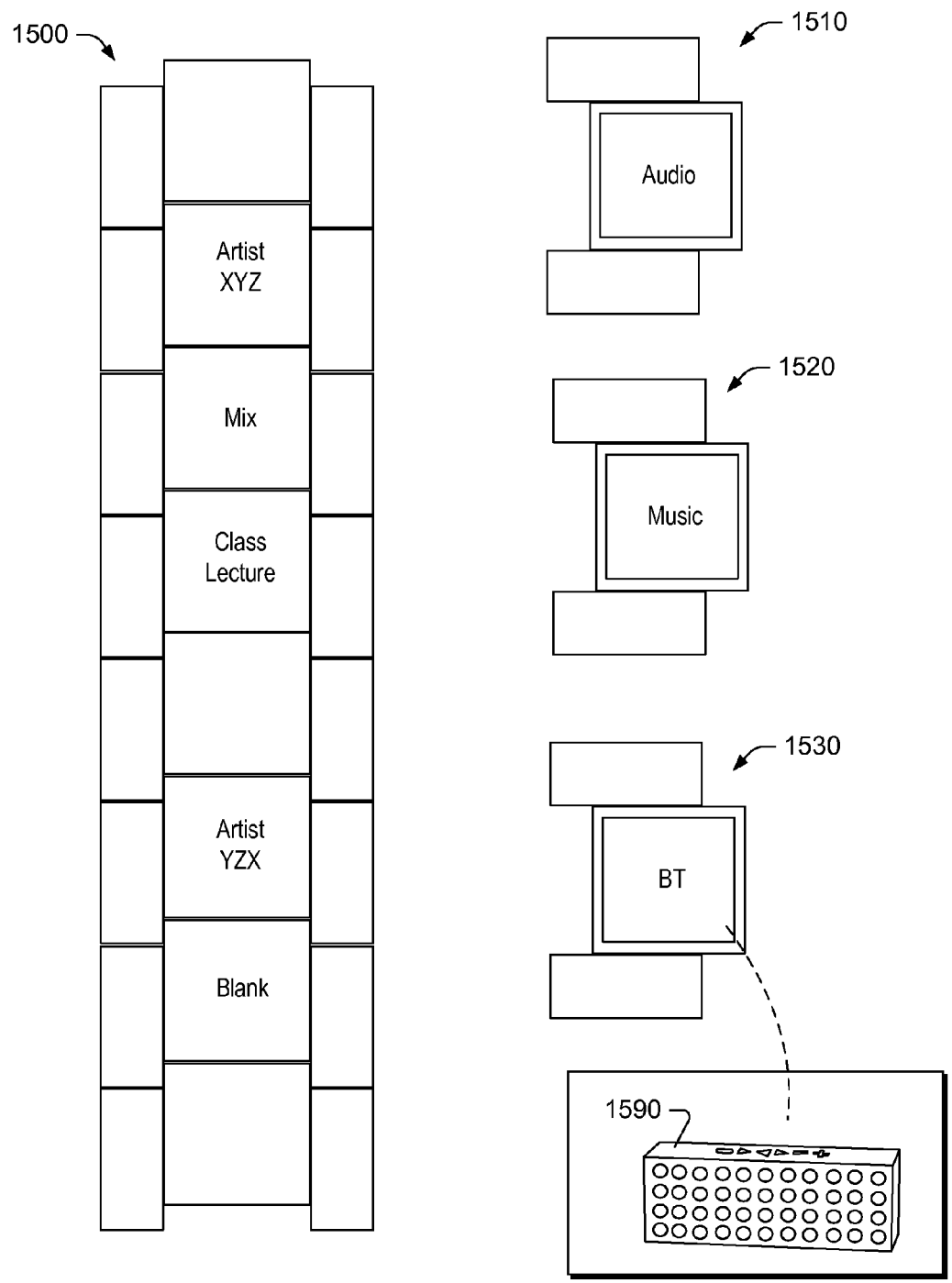
FIG. 15 is a diagram of an example of an apparatus and one or more audio file links.

FIG. 15 shows an example of an apparatus 1500 that includes links such as an audio circuitry link 1510 and an audio file link 1520. As an example, the apparatus 1500 may include a wireless communication link 1530 such as, for example, a Bluetooth® circuitry link ("BT"). In such an example, audio data in the audio file link 1520 may be rendered using audio circuitry in the audio circuitry link 1510. For example, the audio circuitry link 1510 may include an audio codec (e.g., audio code integrated circuit chip, etc.). As an example, where a speaker unit 1590 is available, the wireless communication link 1530 may pair with the speaker unit 1590 for transmission of audio information (e.g., via Bluetooth® technology, etc.).

As an example, a chain of links may include links with audio files. For example, consider a link with audio files for an artist XYZ, a link with audio files for a mix of song files, a link with audio files for one or more class lectures, a link with audio files for an artist YZX, etc. As an example, a link may include memory suitable for storing audio files.

As an example, a user may assemble a chain of links with particular audio files. For example, if a user is going to the beach, the user may assemble a chain of links with one or more links that include audio files for a genre of music such as "beach music" (e.g., The Beach Boys, etc.).

Figure 16:
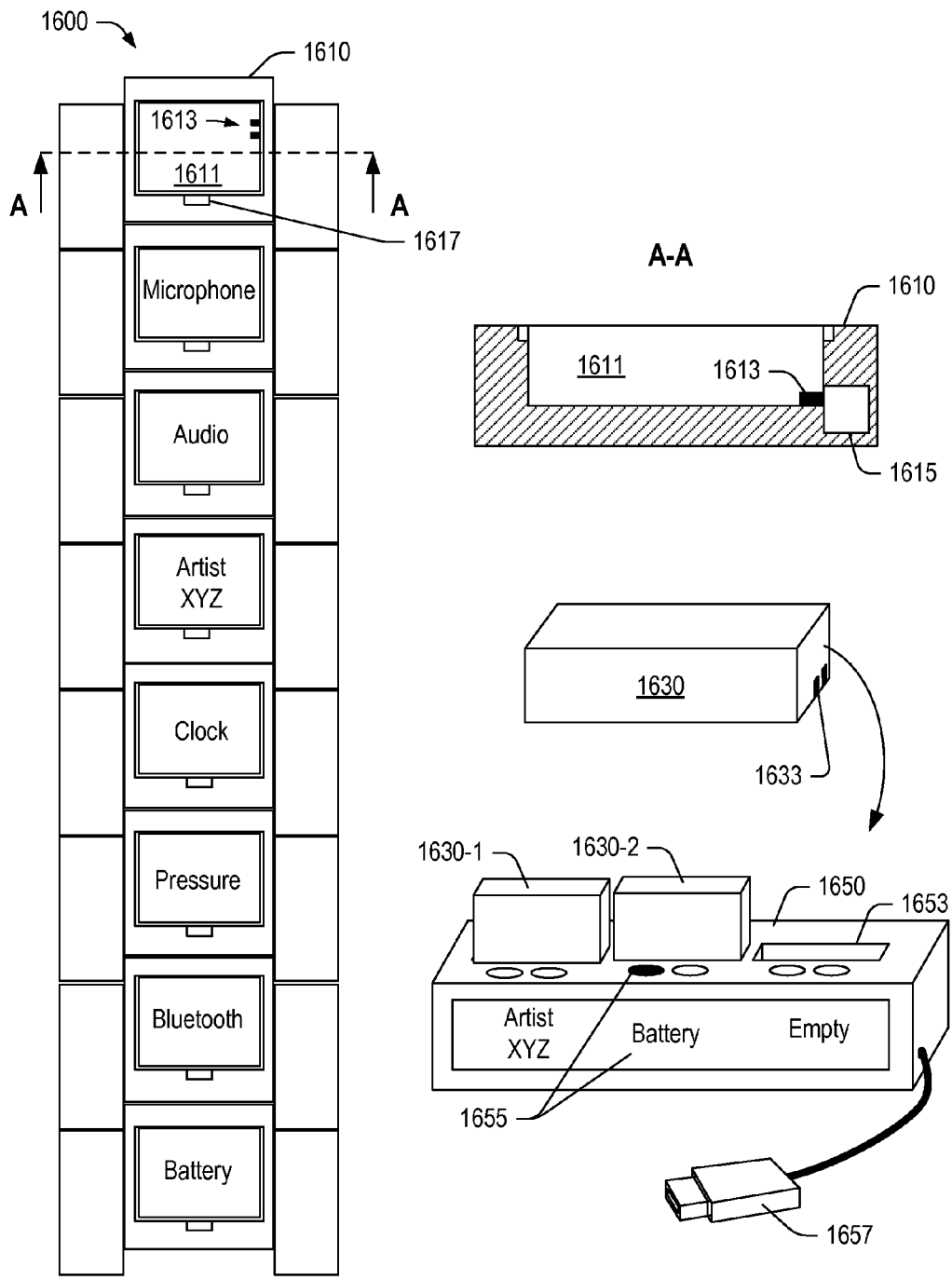
FIG. 16 is a diagram of an example of an apparatus and plug-in modules.

FIG. 16 shows an example of an apparatus 1600 that includes links such as a link 1610. As shown, the link 1610 includes a socket 1611 that may receive a module such as the module 1630. The link 1610 may include one or more features such as the feature 1617, which may facilitate removal of a module from the socket 1611.

As an example, a connection may be made between the link 1610 and the module 1630 via one or more connectors 1613 of the link 1610 and via one or more connectors of the module 1630. As an example, a connection may be an electrical connection where connectors include surfaces that contact. As an example, a link may include wireless communication circuitry and a module may include wireless communication circuitry such that a module may optionally communicate with a link and/or optionally one or more other modules (e.g., in a socket of a link, out of a socket of a link, etc.).

As an example, a station 1650 may include sockets 1653 that can receive respective modules such as the modules 1630-1 and 1630-2. As an example, the station 1650 may include a plug 1657, which may be configured to receive power, transmit information, etc. As an example, consider a USB plug. As an example, the station 1650 may be one or more of a charging station, a data transfer station, a storage station, etc.

As an example, the station 1650 may include one or more display interfaces 1655 (e.g., LED, LCD, etc.) that can indicate information associated with one or more modules. For example, the station 1650 may display information about the module 1630-1 (e.g., artist XYZ for song files), the module 1630-2 (e.g., battery and/or charge level), or empty where a socket of the station 1650 is not occupied by a module.

As an example, a link and/or a module may include a battery and circuitry where the circuitry may be powered by the battery. In such an example, a station or other circuitry may be configured to charge one or more batteries. As an example, charging may occur via wire and/or via wireless charging (e.g., circuitry such as that of one or more of the Duracell® Powermat systems (Procter & Gamble, Cincinnati, Ohio)).

As an example, the apparatus 1600 may include master circuitry to operate one or more modules plugged-into one or more link sockets as slave circuitry. For example, the apparatus 1600 may include master bus circuitry that can recognize, address and transfer information of one or more slave circuits (e.g., slave circuitry).

Figure 17:
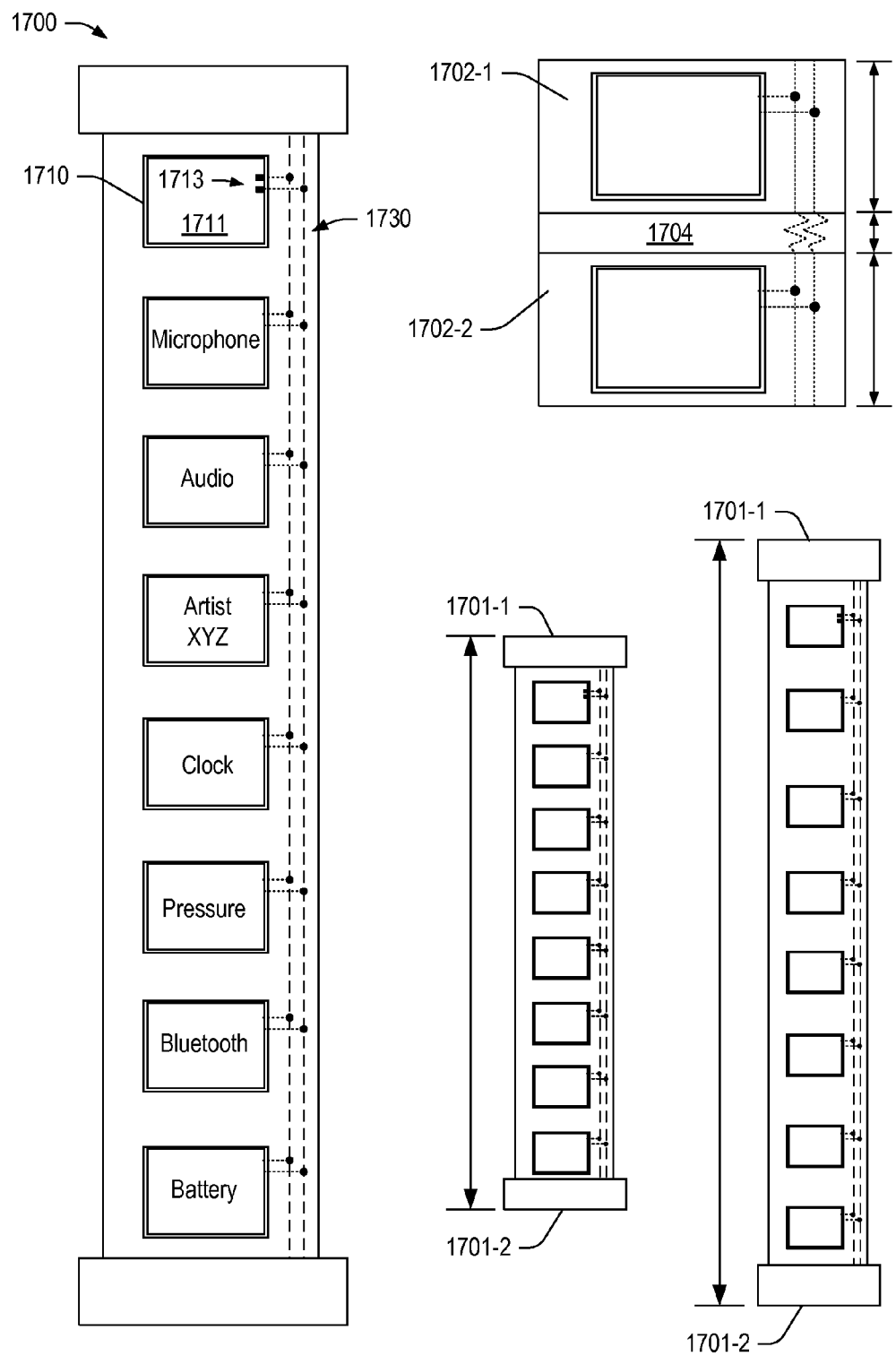
FIG. 17 is a diagram of an example of an apparatus with a resilient band.

FIG. 17 shows an example of an apparatus 1700 that includes ends 1701-1 and 1701-2 that may be joined to form a closed band. As shown, links 1702-1 and 1702-2 may be relatively rigid compared to a resilient portion 1704 that couples the links 1702-1 and 1702-2. As an example, one or more wires 1730 may be carried by the links 1702-1 and 1702-2 and the portion 1704 where the one or more wires 1730 can be expanded in length over at least the portion 1704. For example, the one or more wires 1730 may zigzag when the portion 1704 is in a normal state and may straighten when the portion 1704 is in a tension state (i.e., experiencing strain). As shown, force may be applied to the apparatus 1700 to cause its length to increase, which may facilitate placement of the apparatus 1700 (e.g., with the ends 1701-1 and 1701-2 joined), over a hand to be placed about a wrist.

As an example, the apparatus 1700 may be a continuous band, formed as a closed band, optionally without clasps, etc. at its ends. In such an example, the band may behave as a rubber band as at least some portions of the band may be made of a resilient material (e.g., consider the links 1702-1 and 1702-2 and the portion 1704). As an example, an apparatus may be formed at least in part of an elastomer, a shape memory metal (e.g., nitinol as a nickel/titanium alloy, etc.), etc. As an example, one or more wires of an apparatus may be formed of a shape memory metal. For example, the one or more zigzag wires 1730 (e.g., accordion shape and function) may be formed of a shape memory metal.

In the example of FIG. 17, the one or more wires 1730 may form a bus that may optionally transfer one or more of information, power, clock signals, etc. As an example, the one or more wires 1730 may form a bus with a data line and a clock line. As an example, an apparatus may include circuitry that can transmit one or more signals over a DC power line or lines. As an example, an apparatus may include circuitry that can transmit information using a differential pair of conductors.

As an example, an apparatus may include a stretchy band with electrical connectivity where one or more links, modules, etc. may be operatively coupled to the stretchy band. In the example of FIG. 17, the apparatus 1700 may include sockets such that modules may be received by respective sockets. In such an example, the sockets may be associated with respective links, though one link may include a plurality of sockets. As an example, the apparatus 1700 include a coupling mechanism that may allow for altering a number of links. For example, a coupling mechanism may couple the portion 1704 to the link 1702-1 and/or to the link 1702-2 in a detachable and reattachable manner.

As an example, a wrist-wearable apparatus can include a string of mechanically and communicatively coupled links where, for example, the apparatus includes a plug-in module received by a socket of one of the links.

As an example, an apparatus can include interlocking links, which may be looped, for example, to form a band (e.g., such as a watch band). Such links may include one or more links with circuitry that can be transmit and/or receive information. Links may be interconnected mechanically and electrically to form a wrist band, a necklace, a chain with two ends, etc. As an example, a wrist band may have a circumference of the order of about 5 inches (e.g., about 12 cm) to about 10 inches (e.g., about 25 cm) or more.

As an example, a chain of links may include one or more links that may be separable from the chain and utilized. For example, a link or links may be utilized as a lapel microphone that attaches to a wearable device, to clothing, etc. As an example, a chain may include one or more "smart" links (e.g., circuitry that may perform one or more algorithms, etc.) that can be coupled and uncoupled to allow for customization of functions of the chain of links (e.g., based on user preference, mood, hand size, neck size, etc.).

As an example, links may include flexible interconnections, for example, to accommodate different wearing modes (e.g. wrist shapes and sizes) and, for example, to facilitate device removal (e.g., sliding over a hand to position on a wrist).

Links may include various types of features. For example, consider a main link that includes a processor and memory, a link that includes a power source or supplement power source, a link that includes a battery, a link that includes a solar cell or panel, a link that includes one or more peripheral extensions, a link that include memory, a link that includes a storage compartment, a link that includes a camera, a link that includes a communication module, a link that includes WiFi circuitry, a link that include Bluetooth® circuitry, a link that include NFC circuitry, a link that includes a display, a link that includes a touch screen, a link that includes an input device, a link that includes a sensor, a link that includes a microphone, a link that include GPS circuitry, a link that includes a temperature sensor, a link that includes a heart rate sensor, a link that includes an air quality sensor, a link that includes a Breathalyzer (e.g., for alcohol/ethanol concentration), etc.

As an example, a breath analyzer link (e.g., or links) may capture a sample when a user exhales in proximity to the link (e.g., or links) such that ethanol present in the breath sample is oxidized to acetic acid at an anode and where, at a cathode, atmospheric oxygen is reduced. In such an example, the reaction involves oxidation of ethanol to acetic acid and water where an electrical current can be produced, which may be measured (e.g., to determine an approximation of blood alcohol content (BAC)). As an example, a breath analyzer link may be operatively coupled to a key link operable as a key of a vehicle. In such an example, the breath analyzer link may control the key link such that, for example, the key link is inoperable to engage a drive mechanism (e.g., as associated with an internal combustion engine and/or an electric motor) in a manner that can propel the vehicle.

As an example, a chain of links may include end links, which may be mechanically coupled, optionally with or without electronic coupling. As an example, mechanical coupling mechanisms may include ball-socket pairs, key-keyway pairs, magnet pairs, etc. As an example, where physical connection is established for two links, an electrical connection may also be established. As an example, where physical connection is established for two links, a waveguide or other mechanism may provide for transfer of information from one of the links to the other.

As an example, a number of electrical pins may exist on each end of each link. As an example, an electrical interface may be provided that allows for grounding of links, power delivery to links, data connections between links, link addressing, communication, and configuration, for example, where:

Each link has an ability to communicate with the links connected to it on each end and through them to another one or more links;

Each link may have a unique identifier that distinguishes it from other links attached as a chain of links; and Links that automatically (re)configure when powered up, taken apart, or re-assembled.

As an example, where a chain of links is equipped with more than one display unit, an accelerometer sensor, if present, may be used to determine which link is currently exposed to the wearer attention (e.g., active display), this information may be used, for example, to display notification messages (and similar information) on the active display.

As an example, links may include information about their own length, mass, and capabilities. In such an example, a chain of links may include information about logical configuration and about physical configuration of the chain of links.

As an example, a chain of links may implement a secure protocol. For example, consider a handshaking process that can include secure protocol handshaking, e.g. exchanging key pairs between links, which may require presence confirmation, e.g. button being pressed on both pairing links. In such an example, after the key exchange is finished, a sender link can encode data messages with an addressee link public key and send the encrypted message.

As an example, a chain of links may be configurable via mechanical interfaces that provide for coupling and decoupling of links from the chain of links. As an example, a chain of links may be configured as a band such as an arm band, a wrist band, a waist band (e.g., a belt), a necklace, a string, etc. As an example, a chain of links may be carried in a pocket, coupled to a piece of clothing, coupled to the body via a clip, coupled to the body via piercing (e.g., pin and backing), etc. As an example, a chain of links can include links interconnected mechanically and electrically to form a wrist band, necklace, ring, etc. Such a chain of links may be attachable, for example, as a wearable device with respect to a user's body. As an example, links may be coupled and uncoupled to allow for customization based on user need, preference or mood.

As an example, one or more links of a chain may include a flexible interconnection that can accommodate different wearing modes (e.g. wrist shapes and sizes) and, for example, to facilitate chain removal from a body part, etc. (e.g., to expand for placement over a hand to a wrist or other portion of an arm, a foot to an ankle or other portion of a leg, etc.).

As an example, a chain of links may be removed from one wearable device and connected to another, such as from a bracelet to a necklace, or become its own wearable, such as microphone lapel pin.

As an example, a wearable device may be a chain of links that connects two or more "smart" links together so that they form a smart wearable device. In such an example, links may unite, for example, to enhance and/or extend functionality. As an example, links can be physically connected and communicatively connected. As to the latter, links may be communicatively connected even where one or more links is decoupled and separated from a chain of links. As an example, physical connection may enable a durable mechanical design for wearable device suitable for use in sporting activities (e.g., running, bicycling, swimming, etc.).

As an example, links may be waterproof. As an example, links may be sealed such that they can be submerged in liquid. As an example, a chain of links may include one or more links that can be decoupled from the chain and immersed in a liquid. As an example, a chain of links may include one or more links that can be placed in a particular environment (e.g., hot, cold, chemically different, etc.) that differs from that of a remaining portion of the chain. For example, consider a temperature sensing link with at least one temperature sensor and associated sensor circuitry, optionally including memory for storage of sensed temperature information. Such a link may be decoupled from a chain of links and used for measuring temperature in a particular environment (e.g., a room, an oven, a refrigerator, a freezer, an exterior environment, etc.).

As an example, a link or links may include "baby monitoring" circuitry. For example, consider a chain of links with a gas sensor link (e.g., $O_2$, $CO_2$, CO, etc.), an accelerometer and/or gyroscope link (e.g., for motion of a baby), a temperature link (e.g., for body temperature of a baby), a microphone link (e.g., for sounds in an environment and/or baby sounds), and a communication link (e.g., to communicate sensed information to a WiFi and/or other network).

As an example, one or more links may include near field communication (NFC) circuitry. NFC can be described as a set of short-range wireless technologies, for example, for transfer of information between two or more components where an inter-component distance is about 10 cm or less. As an example, an NFC standard specifies operation at about 13.56 MHz on ISO/IEC 18000-3 air interface and rates ranging from about 106 kbit/s to about 424 kbit/s. NFC can include an initiator and a target where, for example, the initiator actively generates an RF field that can power a passive target. As an example, a link may be an initiator, a target or an initiator and a target. As an example, an NFC target may operate via power delivered by an initiator. As an example, a chain of links may include at least some links that include circuitry for NFC peer-to-peer communication (e.g., where power is available for such communication).

As an example, a link may include NFC tag circuitry, for example, that includes data. In such an example, the link may be read-only, rewriteable, etc. As an example, a link may include memory that can store personal data such as debit and credit card information, loyalty program data, PINs and networking contacts, among other information. Such a link may be protected in that a security mechanism acts to protect the information from unauthorized access. For example, the information stored in a link may be accessible contingent upon the presence of another link (e.g., in a chain of links), upon entry of a code via another link, upon entry of a code via the link in which the information is stored, etc. As an example, a link may include NFC circuitry that can provide for one or more communication speeds and capabilities in terms of configurability, memory, security, data retention and write endurance.

As an example, links in a chain of links may include circuitry for transfer of information via one or more protocols (e.g., $I^2C$, TTL, RS232, RS485, etc.). As to RS232, as an example, two contacts may exist in a link-to-link interface for transmission of data and ground (e.g., consider a digital postal scale link that periodically sends a weight reading, or a GPS receiver link that periodically sends position information, etc.). As an example, three contacts may exist for bi-directional RS232 transfers of information and, for example, where hardware flow control is desired (e.g., in addition to two-way data), contacts may exist for RTS and CTS (e.g., a 5 contact interface).

As an example, a chain of links may be put together or taken apart by a user, optionally without powering down, rebooting, etc. For example, a main link (e.g., or master link) may recognize configuration of associated links upon detachment, attachment, etc. without interruption of functionality provided by the main link and/or one or more other links.

As an example, a chain of links may be provided where the chain is extensible in that one or more additional links may be added at a later time. As an example, a "firmware" link may provide for updating firmware of a chain of links, optionally where it can distribute appropriate code to one or more individual links. As an example, circuitry in links may share one or more resources. For example, consider sharing of power of a battery, a processor, wired and/or wireless communication modules, etc.

As an example, one or more links may be decoupled from a chain of links and used as stand-alone equipment. For example, consider a stand-alone mode for equipment such as a microphone and/or headset lapel pin.

As an example, an apparatus can include links where each of the links includes a link-to-link mechanical interface and a link-to-link electrical interface, where the links include a circuitry link and a battery link, where the circuitry link is mechanically coupled to the battery link via at least one pair of link-to-link mechanical interfaces and where the circuitry link is electrically coupled to the battery link via at least one pair of link-to-link electrical interfaces. In such an example, the circuitry link may include a processor and/or memory.

As an example, a link-to-link electrical interface can include a clock signal contact and a data signal contact. As an example, a link-to-link mechanical interface can include a magnet or magnets. As an example, a link-to-link mechanical interface can include a key and a keyway (e.g., a pin and a socket, etc.) or keys and keyways.

As an example, a chain of links can include a master link that includes a processor and another link that is a circuitry link and a slave link with respect to the master link. As an example, in a chain of links each of the links may include an address. For example, consider a relational address that depends on physical ordering of the links in the chain of links.

As an example, a circuitry link can include detection circuitry and/or emission circuitry (e.g., for a detector and/or an emitter). As an example, detection circuitry may include a microphone. As an example, detection circuitry may include an electromagnetic energy sensor. As an example, emission circuitry may include an electromagnetic energy emitter. As an example, a detector may be an accelerometer, a gyroscope, etc.

As an example, a link may include a reservoir such as, for example, a chemical reservoir (e.g., a chemical reservoir link). As an example, such a reservoir may include a chemical or chemicals.

As an example, a method can include transmitting data via a plurality of link-to-link electrical interfaces of a string of mechanically coupled links. Such a method may include transmitting electrical power from one of the links to another one of the links where the other one of the links includes circuitry and powering the circuitry by electrical power. As an example, a method may include transmitting electrical power via at least one pair of the link-to-link electrical interfaces.

As an example, a wrist-wearable apparatus can include a string of mechanically and electrically coupled links where the links include a battery link that powers circuitry of another one of the links. In such an example, the battery link and the other link can be detachable from the string and operable in a detached state. In such an example, in the detached state, the battery link and the other link may include transmission circuitry that transmits data wirelessly to the string of links.

As an example, a wrist-wearable apparatus can include a string of mechanically and communicatively coupled links. In such an example, each of at least two of the links may include a respective address. For example, such addresses may allow for addressing associated with transfer of data. As an example, a wrist-wearable apparatus may include clock circuitry that operates as a master clock for timing of one or more operations. As an example, timing may be for communication, for recording sensed information, for recording one or more events, etc.

As an example, a chain of links may include one or more song file links and, for example, an audio circuitry link that can access the one or more song file links. In such an example, the chain of links may include electrical interfaces that operate according to an I²S standard. As an example, a chain of links may include one or more links that can sense information and based at least in part on such information make a song recommendation and/or song selection. For example, consider a "mood" circuitry in one or more links that can determine a mood of a user and make at least one song selection based at least in part on that mood.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
an arrangement of coupled links, wherein the links comprise a display link, a circuitry link and a battery link, wherein the circuitry link is mechanically coupled to another one of the links via a pin of the circuitry link, wherein the pin is received by a pin socket of the other link, wherein an electrical interface of the circuitry link is electrically coupled to an electrical interface of the other link, wherein one or more of the coupled links are detachable from the arrangement and operable in a detached state, wherein the circuitry link comprises a circuitry socket and a circuitry module received by the circuitry socket, wherein the circuitry module comprises ambient sensor circuitry, wherein an electrical connection is made between the circuitry link and the circuitry module via a connector of the circuitry link and a connector of the circuitry module, wherein the connectors comprise surfaces that contact, and wherein the connector of the circuitry link is electrically coupled to the electrical interface of the circuitry link.

2. The apparatus of claim 1 wherein the display link comprises a processor.

3. The apparatus of claim 1 wherein the display link comprises memory.

4. The apparatus of claim 1 wherein the electrical interfaces comprise a clock signal contact and a data signal contact.

5. The apparatus of claim 1 comprising a link-to-link mechanical interface that comprises a magnet.

6. The apparatus of claim 1 comprising a link-to-link mechanical interface that comprises a key and a keyway.

7. The apparatus of claim 1 wherein the links comprise a master link that comprises a processor and wherein the circuitry link comprises a slave link.

8. The apparatus of claim 1 wherein each of the links comprises an address.

9. The apparatus of claim 8 wherein the address comprises a relational address that depends on physical ordering of the links.

10. The apparatus of claim 1 wherein the links comprise another circuitry link that comprises detection circuitry.

11. The apparatus of claim 10 wherein the detection circuitry comprises a microphone.

12. The apparatus of claim 10 wherein the detection circuitry comprises an electromagnetic energy sensor.

13. The apparatus of claim 1 wherein the links comprise another circuitry link that comprises emission circuitry.

14. The apparatus of claim 13 wherein the emission circuitry comprises an electromagnetic energy emitter.

15. The apparatus of claim 1 wherein the links comprise another circuitry link that comprises an accelerometer.

16. The apparatus of claim 1 wherein the links comprise a chemical reservoir link.

* * * * *